United States Patent
Watanabe et al.

(10) Patent No.: US 10,787,998 B2
(45) Date of Patent: Sep. 29, 2020

(54) COOLING MECHANISM OF COMBUSTION CHAMBER, ROCKET ENGINE HAVING COOLING MECHANISM, AND METHOD OF MANUFACTURING COOLING MECHANISM

(71) Applicants: MITSUBISHI HEAVY INDUSTRIES, LTD., Tokyo (JP); Japan Aerospace Exploration Agency, Tokyo (JP)

(72) Inventors: Daiki Watanabe, Tokyo (JP); Masaki Adachi, Tokyo (JP); Hiroyuki Kobayashi, Tokyo (JP); Akihide Kurosu, Ibaraki (JP); Hideto Kawashima, Ibaraki (JP); Nobuki Negoro, Ibaraki (JP)

(73) Assignees: MITSUBISHI HEAVY INDUSTRIES, LTD., Tokyo (JP); JAPAN AEROSPACE EXPLORATION AGENCY, Tokyo (JP)

( * ) Notice: Subject to any disclaimer, the term of this patent is extended or adjusted under 35 U.S.C. 154(b) by 350 days.

(21) Appl. No.: 15/556,461

(22) PCT Filed: Mar. 9, 2016

(86) PCT No.: PCT/JP2016/057429
§ 371 (c)(1),
(2) Date: Sep. 7, 2017

(87) PCT Pub. No.: WO2016/143827
PCT Pub. Date: Sep. 15, 2016

(65) Prior Publication Data
US 2018/0051655 A1 Feb. 22, 2018

(30) Foreign Application Priority Data
Mar. 10, 2015 (JP) .................. 2015-047695

(51) Int. Cl.
*F02K 9/64* (2006.01)
*F02K 9/40* (2006.01)
(Continued)

(52) U.S. Cl.
CPC .................. *F02K 9/64* (2013.01); *F01D 5/18* (2013.01); *F02K 9/40* (2013.01); *F02K 9/972* (2013.01);
(Continued)

(58) Field of Classification Search
CPC ... F02K 9/40; F02K 9/64; F02K 9/972; F01D 5/18; F23R 2900/03043; F23R 2900/03045; Y10T 29/49341; Y10T 29/49995
See application file for complete search history.

(56) References Cited

U.S. PATENT DOCUMENTS 6,282,905 B1   9/2001  Sato et al.
8,650,882 B2 *  2/2014  Woolford ................ F23R 3/002
                                                60/752
(Continued)

FOREIGN PATENT DOCUMENTS

EP   2 093 409    8/2009
JP   1-227850     9/1989
(Continued)

OTHER PUBLICATIONS

International Search Report dated May 31, 2016 in International Application No. PCT/JP2016/057429.
(Continued)

*Primary Examiner* — Todd E Manahan
*Assistant Examiner* — Kyle Robert Thomas
(74) *Attorney, Agent, or Firm* — Wenderoth, Lind & Ponack, L.L.P.

(57) ABSTRACT

A cooling mechanism includes a bottom wall (22) in contact with a combustion chamber, an upper wall (30), and a
(Continued)

cooling passage (40) arranged between the bottom wall (22) and the upper wall (30). The cooling passage (40) includes a first passage (50) extending to a first direction, a second passage (60) extending to the first direction, and a connection section (70) connected with the first passage (50) and the second passage (60). The second passage (60) is arranged to have an offset to the first passage (50) in a second direction perpendicular to the first direction and along the bottom wall (22).

18 Claims, 24 Drawing Sheets

(51) Int. Cl.
    *F23R 3/00*       (2006.01)
    *F23M 5/08*       (2006.01)
    *F02K 9/97*        (2006.01)
    *F01D 5/18*       (2006.01)

(52) U.S. Cl.
    CPC ............... *F23M 5/08* (2013.01); *F23R 3/005* (2013.01); *F05D 2260/2212* (2013.01); *F05D 2260/2214* (2013.01); *F23R 2900/03043* (2013.01); *F23R 2900/03045* (2013.01); *Y10T 29/49341* (2015.01); *Y10T 29/49995* (2015.01)

(56) References Cited

U.S. PATENT DOCUMENTS

| | | |
|---|---|---|
| 2004/0103640 A1 | 6/2004 | Haggander |
| 2004/0237533 A1 | 12/2004 | Lundgren |
| 2005/0188678 A1 | 9/2005 | Haggander |
| 2007/0022741 A1 | 2/2007 | Frobhlich |
| 2008/0264035 A1 | 10/2008 | Ricciardo |
| 2009/0235636 A1 | 9/2009 | Oehrlein |
| 2010/0223931 A1* | 9/2010 | Chila ...................... F23R 3/005 60/760 |
| 2011/0016720 A1* | 1/2011 | Plaskett ................... B28D 1/04 29/897.3 |

FOREIGN PATENT DOCUMENTS

| | | |
|---|---|---|
| JP | 2532554 | 4/1997 |
| JP | 2000-88252 | 3/2000 |
| JP | 2000-145479 | 5/2000 |
| JP | 2007-506017 | 3/2007 |
| JP | 4019215 | 12/2007 |
| JP | 2008-274937 | 11/2008 |
| JP | 2011-89462 | 5/2011 |
| JP | 2014-98352 | 5/2014 |
| KR | 10-0959793 | 5/2010 |
| RU | 2 514 863 | 5/2014 |
| WO | 2008/010748 | 1/2008 |

OTHER PUBLICATIONS

International Preliminary Report on Patentability dated Sep. 21, 2017 in International Application No. PCT/JP2016/057429, with English translation.
Extended European Search Report dated Feb. 16, 2018 in European Patent Application No. 16761794.3.

* cited by examiner

COOLING MECHANISM OF COMBUSTION CHAMBER, ROCKET ENGINE HAVING COOLING MECHANISM, AND METHOD OF MANUFACTURING COOLING MECHANISM

TECHNICAL FIELD

The present invention relates to a cooling mechanism of a combustion chamber, a rocket engine having the cooling mechanism, and a method of manufacturing the cooling mechanism.

BACKGROUND ART

The wall of a combustion chamber becomes hot with heat generated by combustion of fuel. There is a case that a cooling mechanism is provided to be adjacent to the combustion chamber, in order to prevent a damage of the wall of the combustion chamber due to the heat generated by combustion of fuel. The cooling mechanism has a cooling passage through which a cooling medium flows.

Of the cooling medium which flows through the cooling passage, the temperature rise of the cooling medium which flows through a side near the combustion chamber is large. On the other hand, the temperature rise of the cooling medium which flows through a side far from the combustion chamber is small. In other words, in a cross section of the cooling passage perpendicular to the longitudinal direction of the cooling passage, the temperature of the cooling medium on the side near the combustion chamber is relatively high, and the temperature of the cooling medium on the side far from the combustion chamber is relatively low. When the above-mentioned temperature distribution (i.e. a temperature inclination) exists in the cross section perpendicular to the longitudinal direction of the cooling passage, the cooling efficiency by the cooling mechanism declines, compared with a case where the above-mentioned temperature distribution (i.e. the temperature inclination) does not exist.

As the related technique, Patent Literature 1 discloses that convection heat transfer in the cooling passage is improved by inserting a twisting ribbon or a twisting wire in the cooling passage.

CITATION LIST

[Patent Literature 1] JP 2008-274937A

SUMMARY OF THE INVENTION

An object of the present invention is to provide a cooling mechanism of a combustion chamber in which the stirring of a cooling medium is promoted and the cooling efficiency by the cooling mechanism is improved by arranging a first passage extending to a first direction, and a second passage extending to the first direction to have an offset, a rocket engine having the cooling mechanism, and a method of manufacturing the cooling mechanism.

The cooling mechanism of the combustion chamber in some embodiments includes a bottom wall in contact with the combustion chamber; an upper wall; and a cooling passage arranged between the bottom wall and the upper wall. The cooling passage includes a first passage arranged along the bottom wall to extend to a first direction; a second passage arranged along the bottom wall to extend to the first direction; and a first connection section connected with the first passage and the second passage. A longitudinal center axis of the first passage and a longitudinal center axis of the second passage are separated from each other in a second direction perpendicular to the first direction and extending along the bottom wall. The second passage is connected with an end of the first connection section in the first direction. The first passage is connected with an end of the first connection section in a direction opposite to the first direction.

The rocket engine in some embodiments includes the above-mentioned cooling mechanism.

The method of manufacturing the cooling mechanism in some embodiments includes preparing a first member having a bottom surface and an upper surface. The manufacturing method includes forming a first ditch in the first member to extend to a first direction, by moving a rotating rotary blade along the bottom surface to the first direction or a direction opposite to the first direction. The manufacturing method includes forming a second ditch in the first member to extend to the first direction, by moving the rotating rotary blade along the bottom surface to the first direction or the direction opposite to the first direction. The manufacturing method includes forming a first connection section to connect the first ditch and the second ditch. The forming the first connection section includes forming a first collision wall in a side end of the first connection section in the first direction by cutting by the rotating rotary blade such that a distance from the bottom surface becomes larger as heading for the first direction.

According to the present invention, the cooling mechanism of the combustion chamber is provided, in which the stirring of the cooling medium is promoted and the cooling efficiency by the cooling mechanism is improved by arranging the first passage extending to a first direction, and the second passage extending to the first direction to have an offset, and a rocket engine having the cooling mechanism and a method of manufacturing the cooling mechanism are provided.

BRIEF DESCRIPTION OF THE DRAWINGS

The attached drawings are incorporated into this Description to help the description of embodiments. Note that the drawings should not be interpreted to limit the present invention to shown and described examples.

DESCRIPTION OF THE EMBODIMENTS

A cooling mechanism of a combustion chamber, a rocket engine having the cooling mechanism, and a method of manufacturing the cooling mechanism will be described with reference to the attached drawings. In the following detailed description, many detailed specific matters are disclosed for the purpose of description to provide the comprehensive understanding of embodiments. However, it would be apparent that one or more embodiments are executable without these detailed specific matters.

Definition of Coordinate System

As shown in FIG. 3B, FIG. 3C, FIG. 5B, FIG. 5C, FIG. 6A, FIG. 7A, FIG. 8A, FIG. 9, FIG. 10, FIG. 13A and so on, an axis along a longitudinal direction of a first passage is defined as an "X axis". Also, the direction to which a cooling medium flows along the first passage is defined as a "+X direction". A direction opposite to the +X direction is defined as a "−X direction". A direction is merely referred to as an "X direction" when the direction is one of the −X direction and the +X direction and the direction is the +X direction or the −X direction is not important.

As shown in FIG. 3A, FIG. 3B, FIG. 5A, FIG. 5B, FIG. 6A, FIG. 7A, and FIG. 13A, an axis perpendicular to the X direction and the axis in the direction apart from the combustion chamber is defined as a "Z axis". In the Z axis, the direction apart from the combustion chamber is defined as a "+Z direction", and the direction approaching the combustion chamber is defined as the "−Z direction".

An axis perpendicular to the X axis and the Z axis is defined as a "Y axis". Also, a direction to which a right-hand thread goes ahead when rotating the Z axis for the X axis is defined as a "+Y direction", and a direction opposite to the "+Y direction" is defined as a "−Y direction". When the longitudinal direction of the first passage changes, the X axis is an axis defined in correspondence to a local area of the first passage. Also, when the direction apart from the combustion chamber changes, the Z axis is an axis defined in correspondence to a local area of the first passage.

Definition of Terms

The "first direction" means the "+X direction". The "second direction" means the "+Y direction" or the "−Y direction". The "third direction means the "+Z direction".

Overview of Cooling Mechanism

Figure 1:
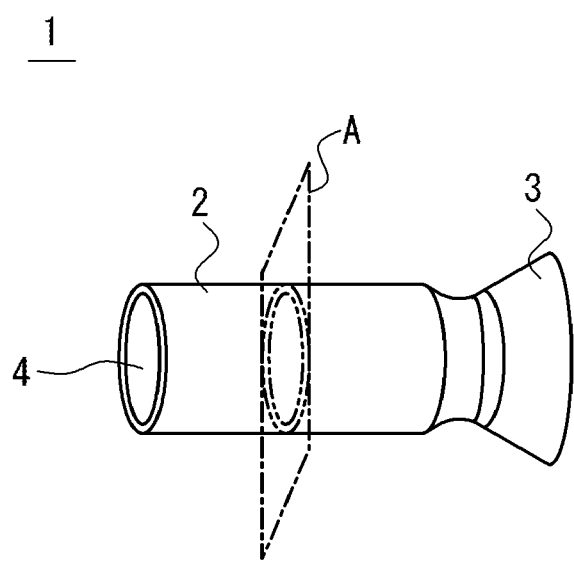
FIG. 1 is a schematic perspective view of a rocket engine to which a cooling mechanism is applied.
Figure 2A:
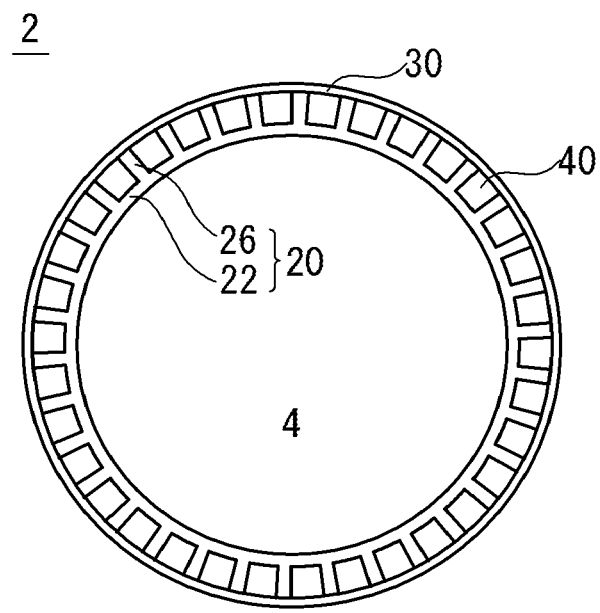
FIG. 2A is a sectional view along a plane A of FIG. 1.
Figure 2B:
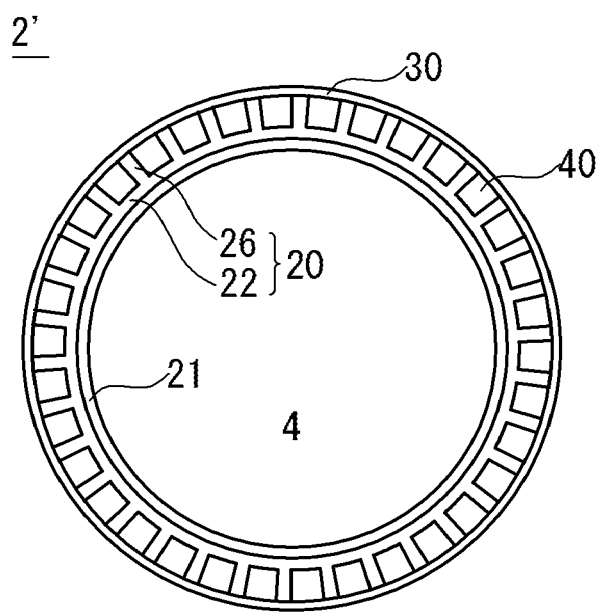
FIG. 2B is a sectional view along the plane A of FIG. 1 and shows a modification example.
Figure 3A:
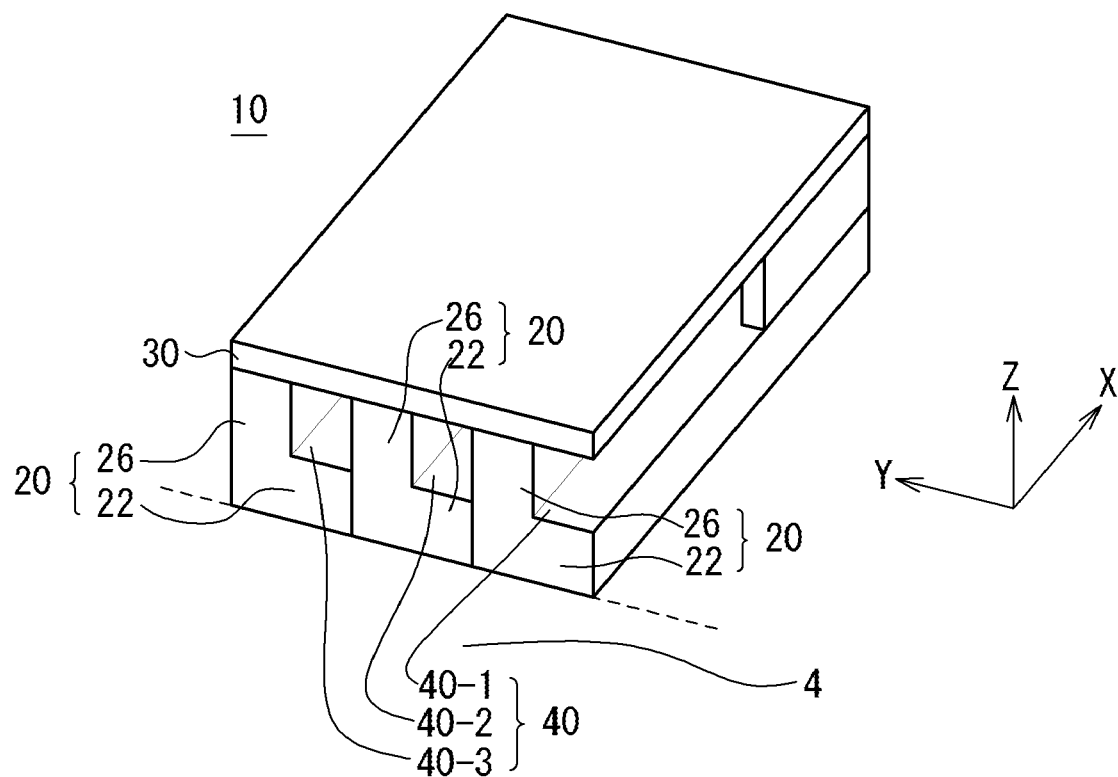
FIG. 3A is a schematic perspective view showing a part of a cooling mechanism.
Figure 3B:
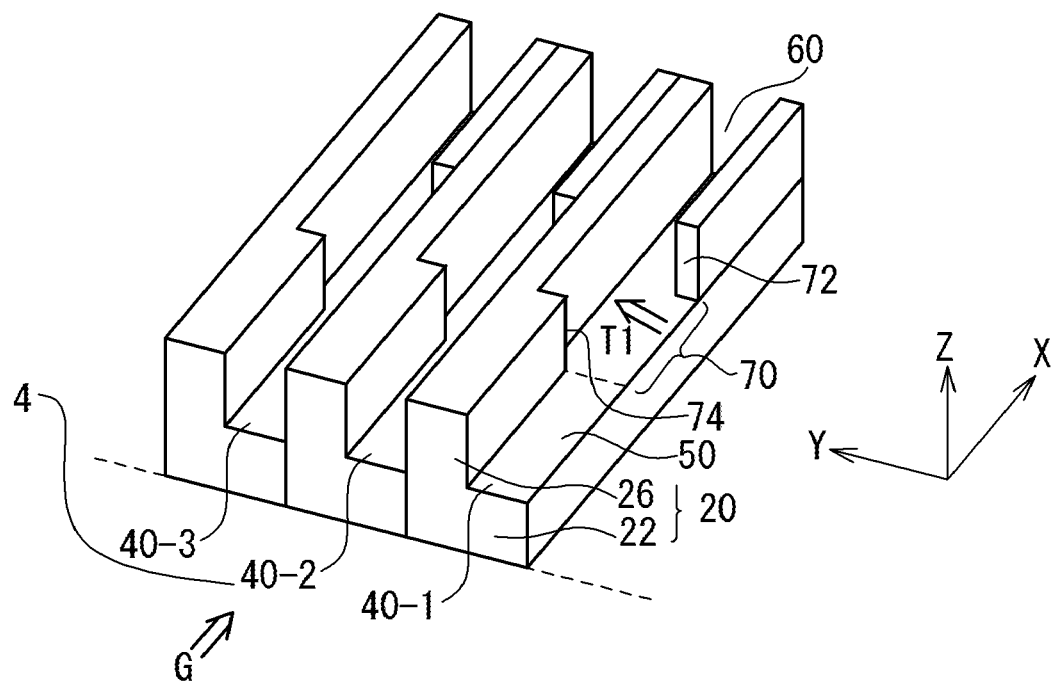
FIG. 3B is a schematic perspective view showing the part of the cooling mechanism and is a diagram when an upper wall is omitted.
Figure 3C:
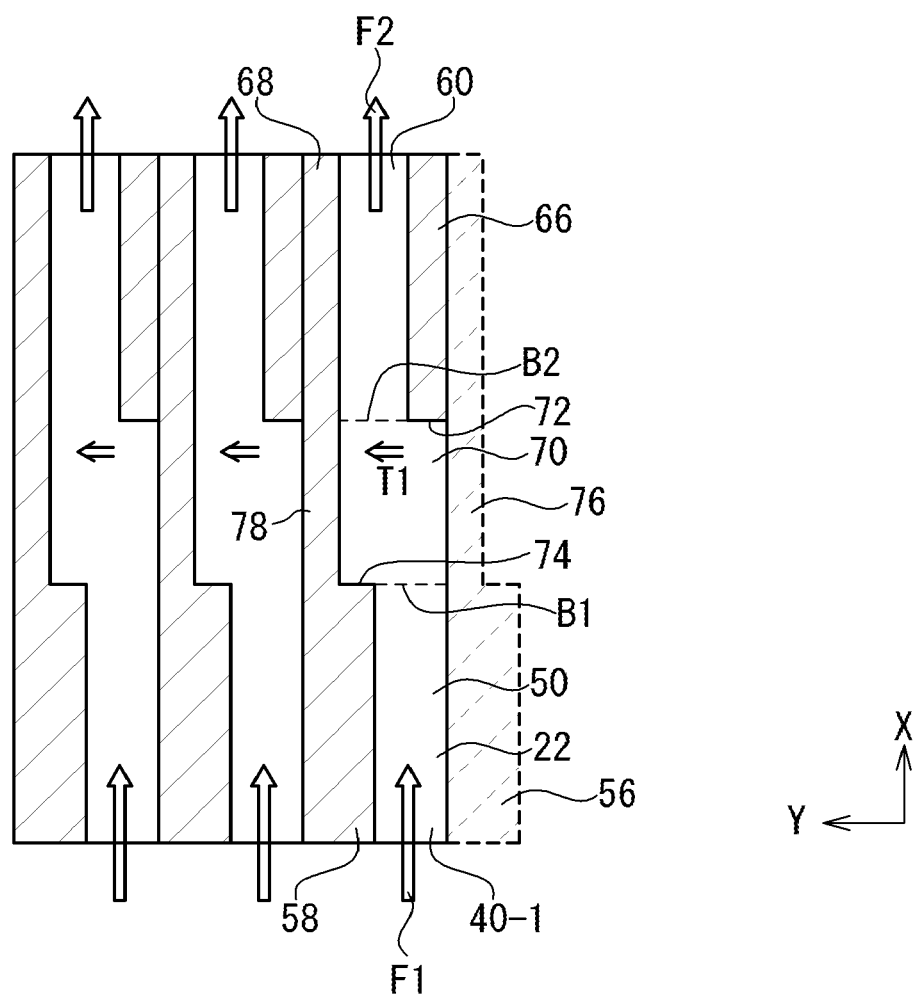
FIG. 3C is a plan view of the part of the cooling mechanism shown in FIG. 3B and is a diagram when the upper wall is omitted.
Figure 4:
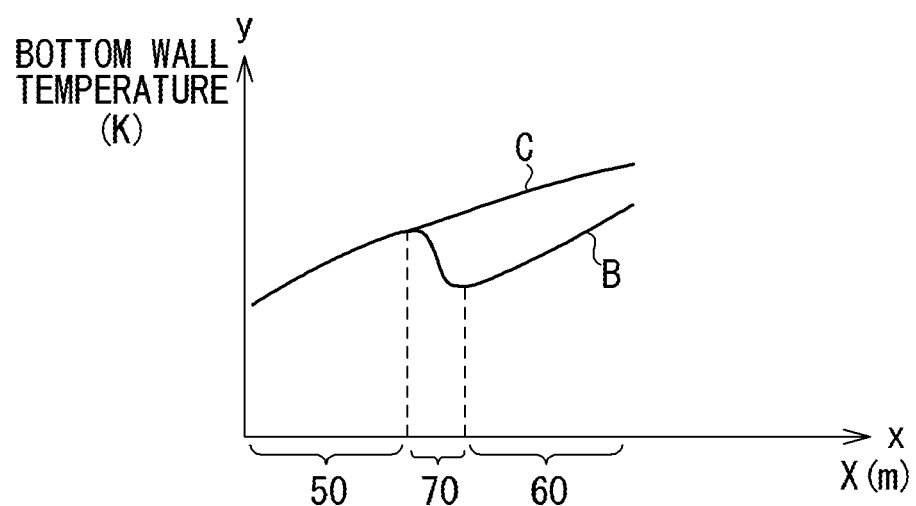
FIG. 4 is a graph schematically showing a temperature distribution of a bottom wall.

Referring to FIG. 1 to FIG. 4, the overview of a cooling mechanism will be described. FIG. 1 is a schematic perspective view of a rocket engine to which the cooling mechanism is applied. FIG. 2A and FIG. 2B are sectional views along a plane A of FIG. 1. FIG. 3A is a schematic perspective view showing a part of the cooling mechanism. FIG. 3B is a schematic perspective view showing the part of the cooling mechanism and is a diagram when an upper wall is omitted. FIG. 3C is a plan view of the part of the cooling mechanism shown in FIG. 3B and is a diagram when the upper wall is omitted. FIG. 4 is a graph schematically showing the temperature distribution of the bottom wall.

Referring to FIG. 1, an example of a target to which the cooling mechanism according to an embodiment is applied will be described. FIG. 1 shows a rocket engine 1. The rocket engine 1 includes a combustor 2 and a nozzle 3. The combustor 2 includes a combustion chamber 4.

FIG. 2A is a sectional view along the plane A of FIG. 1. The combustor 2 includes a bottom wall 22 in contact with the combustion chamber 4, an upper wall 30 and a plurality of side walls 26. Each of the side walls 26 is connected with the upper wall 30 and the bottom wall 22. In an example shown in FIG. 2A, the bottom wall 22 and the plurality of side walls 26 are formed as a unitary body, and configures a first member 20 from the bottom wall 22 and the plurality of side walls 26. Also, the upper wall 30 configures a second member formed separately from the first member. The first member 20 and the second member are bonded by a welding method, a brazing method and so on. However, the configuration of the bottom wall, the side walls, and the upper wall is not limited to an example of FIG. 2A. For example, each of the bottom wall, the side wall, and the upper wall may be separately formed. Note that the bottom wall 22 (or the bottom wall 22 and the side wall 26) is sometimes called an inner wall, and the upper wall 30 is sometimes called an outer wall.

The space surrounded by the bottom wall 22, the upper wall 30 and the two side walls 26 configures a cooling passage 40, through which a cooling medium flows and passes. In FIG. 2A, an example in which a plurality of cooling passages 40 are provided is shown. However, the number of cooling passages 40 is an optional integer equal to or more than one. When the cooling mechanism is applied to the rocket engine 1, the cooling medium is, for example, liquid-hydrogen. However, a kind of cooling medium is not limited to the liquid-hydrogen and is optional. The cooling medium may be liquid, may be gas and may be supercritical fluid.

The materials of the bottom wall, the upper wall, and the side wall are optional. When the cooling mechanism is applied to the rocket engine 1, the materials of the bottom wall, the upper wall, and the side walls are, for example, copper alloy.

FIG. 2B shows a modification example of the combustor. The combustor 2' is different from the combustor 2 shown in FIG. 2A in that a wall 21 surrounding the combustion chamber 4 is provided as a member separate from the bottom wall 22. The wall 21 and the bottom wall 22 are separately formed, and the wall 21 and the bottom wall 22 are bonded by a welding method, a brazing method and so on. In case of the combustor shown in FIG. 2B, a combination of the wall 21 and the bottom wall 22 is called the bottom wall.

Note that an example in which the cooling mechanism is applied to the combustion chamber of the rocket engine has been described in FIG. 1 to FIG. 2B. However, the object to which the cooling mechanism is applied is not limited to the example of FIG. 1 to FIG. 2B and is optional. The object to which the cooling mechanism is applied is an optional target in which cooling is needed.

FIG. 3A is a schematic perspective view showing a part of the cooling mechanism. FIG. 3A shows an example of the cooling mechanism. The cooling mechanism 10 has a plurality of cooling passages 40 that include a first cooling passage 40-1, a second cooling passage 40-2, and a third cooling passage 40-3. Note that the cooling passages other than the first cooling passage 40-1, the second cooling passage 40-2, and the third cooling passage 40-3 are omitted in FIG. 3A, to avoid the complication of the drawing.

Each of the first cooling passages 40-1, the second cooling passages 40-2, and the third cooling passages 40-3 is arranged between the bottom wall 22 and the upper wall 30. In more detail, the first cooling passage 40-1 is a passage surrounded by the bottom wall 22, the upper wall 30 and the two side walls 26 (note that one of the side walls is omitted). In the same way, the second cooling passage 40-2 is a passage surrounded by the bottom wall 22, the upper wall 30 and the two side walls 26. Also, the third cooling passage 40-3 is s passage surrounded with the bottom wall 22, the upper wall 30 and the two side walls 26. The bottom wall 22 is in contact with the combustion chamber 4. In other words, the bottom surface of the bottom wall faces directly to a combustion space as the combustion chamber 4.

Note that in FIG. 3A, an example will be described in which the first member 20 configuring first cooling passage 40-1, the first member 20 configuring the second cooling passage 40-2, and the first member 20 configuring the third cooling passage 40-3 are separately formed, and bonded to each other. However, the embodiment is not limited to the example of FIG. 3A. For example, the first member 20 configuring the first cooling passage 40-1, the first member 20 configuring the second cooling passage 40-2, and the first member 20 configuring the third cooling passage 40-3 may be formed from a single member as a unitary body. Also, in FIG. 3A, an example in which the cross section of each cooling passage 40 perpendicular to the X axis is rectangular will be described. However, the cross section shape of each cooling passage 40 is optional.

FIG. 3B is a schematic perspective view showing the part of the cooling mechanism, and is a diagram in which the upper wall 30 is removed from the configuration of FIG. 3A. The first cooling passage 40-1 wills be described. The first cooling passage 40-1 is a cooling passage arranged between the bottom wall 22 in contact with the combustion chamber 4 and the upper wall (not shown in FIG. 3B).

The first cooling passage 40-1 has a first passage 50 which is arranged along the bottom wall 22 to extend along the +X direction (in other words, the first direction). Also, the first cooling passage 40-1 has a second passage 60 which is arranged along the bottom wall 22 to extend o the +X direction (in other words, the first direction). The second passage 60 is arranged to have an offset to the first passage 50 in the direction along the Y axis (i.e. the second direction). Note that when the shape of the combustion chamber 4 is cylindrical, the direction along the Y axis is a direction along the circumference of the circular cylinder.

The first cooling passage 40-1 has a connection section 70 (a first connection section 70) which is arranged between the first passage 50 and the second passage 60 in the direction along the X axis. The connection section 70 can be called a connection passage. The connection section 70 is connected with the first passage 50 and the second passage 60. The first passage 50 is connected with a side of the connection section 70 in the −X direction (the direction opposite to the first direction). Also, the second passage 60 is connected with a side of the connection section 70 in the +X direction (the first direction).

In an end of the connection section 70 in the +X direction (the first direction), a first collision wall 72 is disposed to collide with a part of the cooling medium which flows through the connection section 70 to the +X direction (the first direction). Also, in the side of the connection section 70 in the −X direction (a direction opposite to the first direction), a second collision wall 74 is arranged to collide with a part of the cooling medium which flows through the connection section 70 to the −X direction (a direction opposite to the first direction).

The cooling medium which flows through the first passage 50 to the +X direction flows into the connection section 70 from the side of the connection section 70 in the −X direction. A part of the cooling medium which flows into the connection section 70 and flows through the connection section 70 to the +X direction collides with the first collision wall 72. A momentum component is given to the cooling medium through the collision to proceed toward directions except for the +X direction, and the cooling medium is stirred. The momentum component to proceed toward one direction except for the X direction is typically a momentum component T1 in the direction along the Y axis (i.e., the momentum component along the second direction), a momentum component in the direction along the Z axis, or a momentum component to proceed to the −X direction.

Note that an example in which a flow direction of combustion gas G in the combustion chamber 4 is in the +X direction is shown in FIG. 3B. However, the flow direction of combustion gas G is not limited to the example of FIG. 3B and is optional.

FIG. 3C is a plan view of a part of the cooling mechanism shown in FIG. 3B, and is a diagram when the upper wall is omitted. Note that in FIG. 3C, the side wall of the first cooling passage 40-1 in the −Y direction is shown by a broken line.

In an example shown in FIG. 3C, the first passage 50 is a passage surrounded by a first side wall 56, a second side wall 58, the bottom wall 22 and the upper wall (not shown in FIG. 3C). Also, the connection section 70 (the connection passage) is a portion surrounded by a first side wall 76, a second side wall 78, the bottom wall 22, the upper wall (not shown in FIG. 3C), a first boundary surface section B1 (a boundary surface section between the first passage 50 and the connection section 70), a second boundary surface section B2 (a boundary surface section between the connection section 70 and the second passage 60), the first collision wall 72 and the second collision wall 74. Also, the second passage 60 is a passage surrounded by a first side wall 66, a second side wall 68, the bottom wall 22 and the upper wall (not shown in FIG. 3C). Note that in the example shown in FIG. 3C, an area hatched by a slanted line shows an area where the side wall exists.

The cooling medium F1 which flows through the first passage 50 flows into the connection section 70 through the first boundary surface section B1 between the first passage 50 and the connection section 70. A momentum component T1 in a direction along +Y direction and a momentum component in the direction along the Z axis are given by the first collision wall 72 to the cooling medium which flows through the connection section 70. The cooling medium which flows through the connection section 70 flows into the second passage 60 through the second boundary surface section B2 between the connection section 70 and the second passage 60. The cooling medium F2 which flows through the second passage 60 becomes large in the degree of turbulence by passing through the connection section 70, compared with the cooling medium F1 which flows through the side of the first passage 50 to the +X direction.

FIG. 4 is a graph schematically showing a temperature distribution of the bottom wall. The x-axis of FIG. 4 shows a position of the bottom wall 22 along the +X direction (the unit: meter). The y-axis of FIG. 4 shows temperature of the bottom wall 22 (the unit: Kelvin). In FIG. 4, a curve shown by "B" shows a temperature change of the bottom wall when the cooling mechanism according to the embodiment is adopted, and a curve shown by "C" shows a temperature change of the bottom wall when the first passage and the second passage are not arranged to have an offset.

The cooling medium which flows through the first passage 50 is gradually heated with the heat transferred from the combustion chamber. For this reason, when the cooling medium advances toward the downstream of the first passage 50 (to the +X direction), the cooling effect by the cooling medium declines gradually. As a result, the temperature of the bottom wall of the first passage 50 rises gradually from the upstream of the first passage 50 (the −X direction) to the downstream (the −X direction) (reference to the temperature change of the first passage 50, i.e., a part of the curve "B" corresponding to the first passage 50).

In the connection section 70, the cooling medium is stirred since a part of the cooling medium collides with the first collision wall 72. Therefore, a part of the cooling medium having relatively higher temperature moves to leave from the bottom wall (the +Z direction), and a part of the cooling medium having relatively lower temperature moves to the direction approaching the bottom wall (the −Z direction). As a result, it is possible to make the temperature of the bottom wall of the connection section 70 lower than the temperature of the bottom wall on the downstream side of the first passage 50 (a part on the +X direction) (reference to the temperature change of the connection section 70, i.e. a part of the curve "B" corresponding to the connection section 70).

The cooling medium which flows through the second passage 60 is gradually heated with the heat transferred from the combustion chamber. Therefore, as the cooling medium advances toward the downstream of the second passage 60 (the +X direction), the cooling effect by the cooling medium declines gradually. As a result, the temperature of the bottom wall in the second passage 60 rises gradually from the upstream of the second passage 60 (the −X direction) to the downstream thereof (the +X direction). The temperature of the bottom wall in the upstream of the second passage 60 (the −X direction) is kept relatively low by the stirring effect of the cooling medium in the connection section 70. In other words, the temperature of the bottom wall in the second passage 60 when the cooling mechanism according to the embodiment is adopted (reference to a part of the curve "B" corresponding to the second passage 60) becomes lower than the temperature of the bottom wall in the second passage 60 when the first passage and the second passage are not arranged to have an offset (reference to a part of the curve "C" corresponding to the second passage 60). Therefore, when the cooling mechanism according to embodiment is adopted, the cooling efficiency of the bottom wall by the cooling mechanism is improved.

First Modification Example of Collision Wall

Figure 5A:
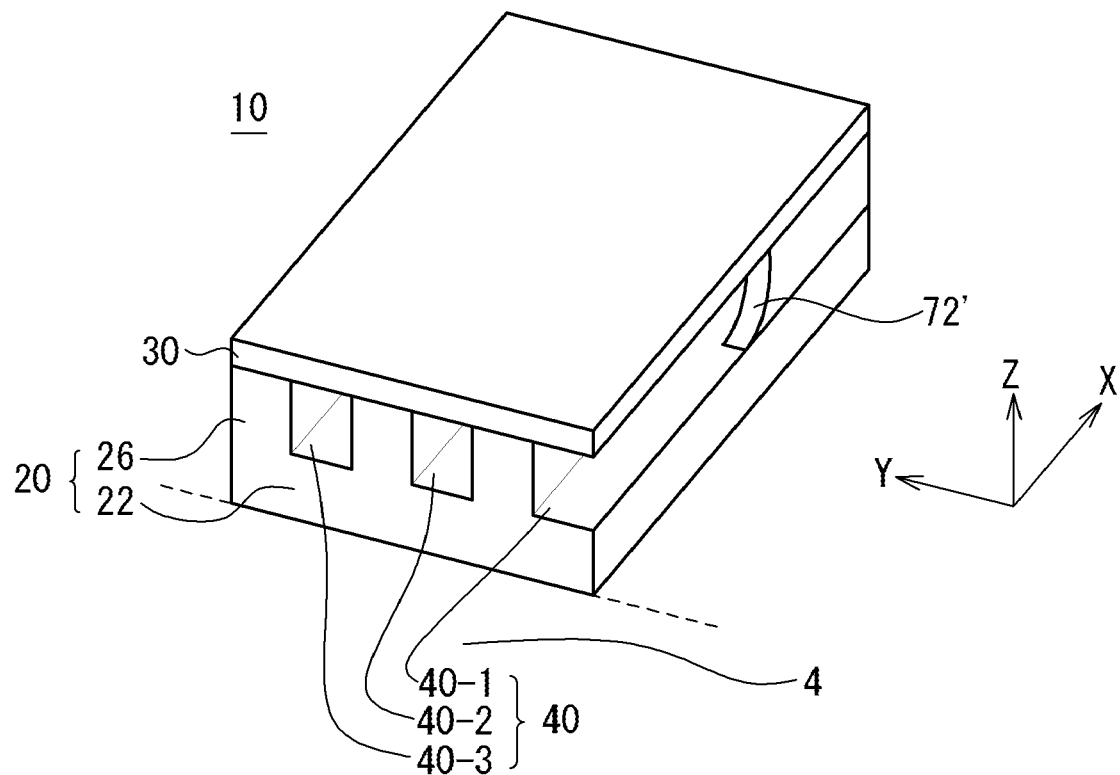
FIG. 5A is a schematic perspective view showing a part of the cooling mechanism.
Figure 5B:
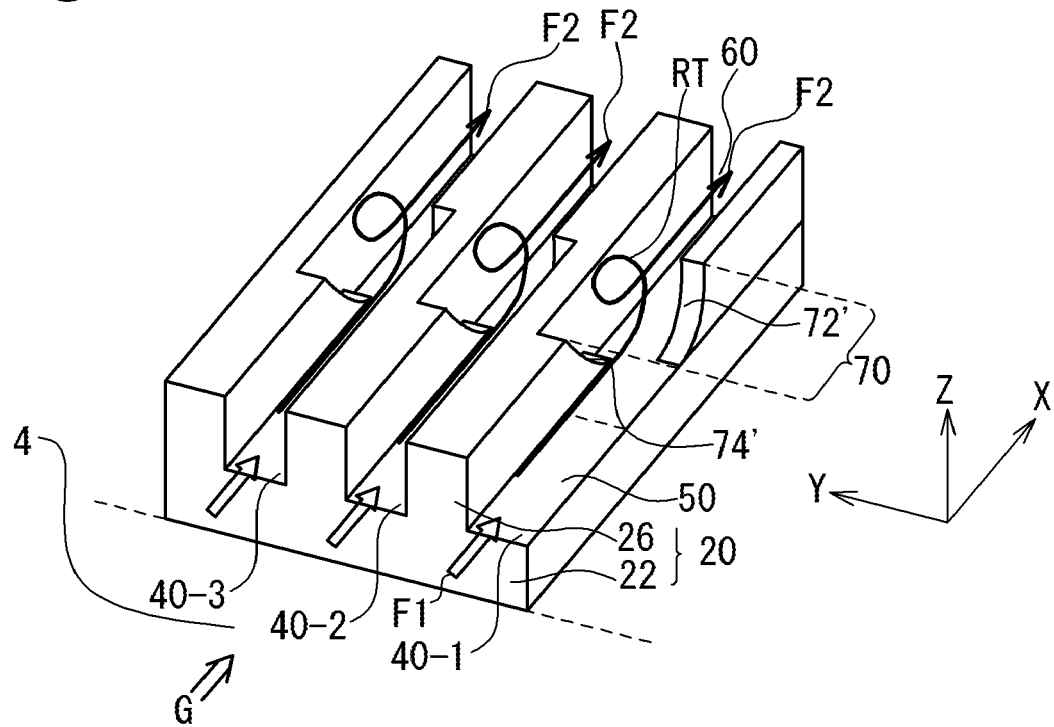
FIG. 5B is a schematic perspective view showing the part of the cooling mechanism and is a diagram when an upper wall is omitted.
Figure 5C:
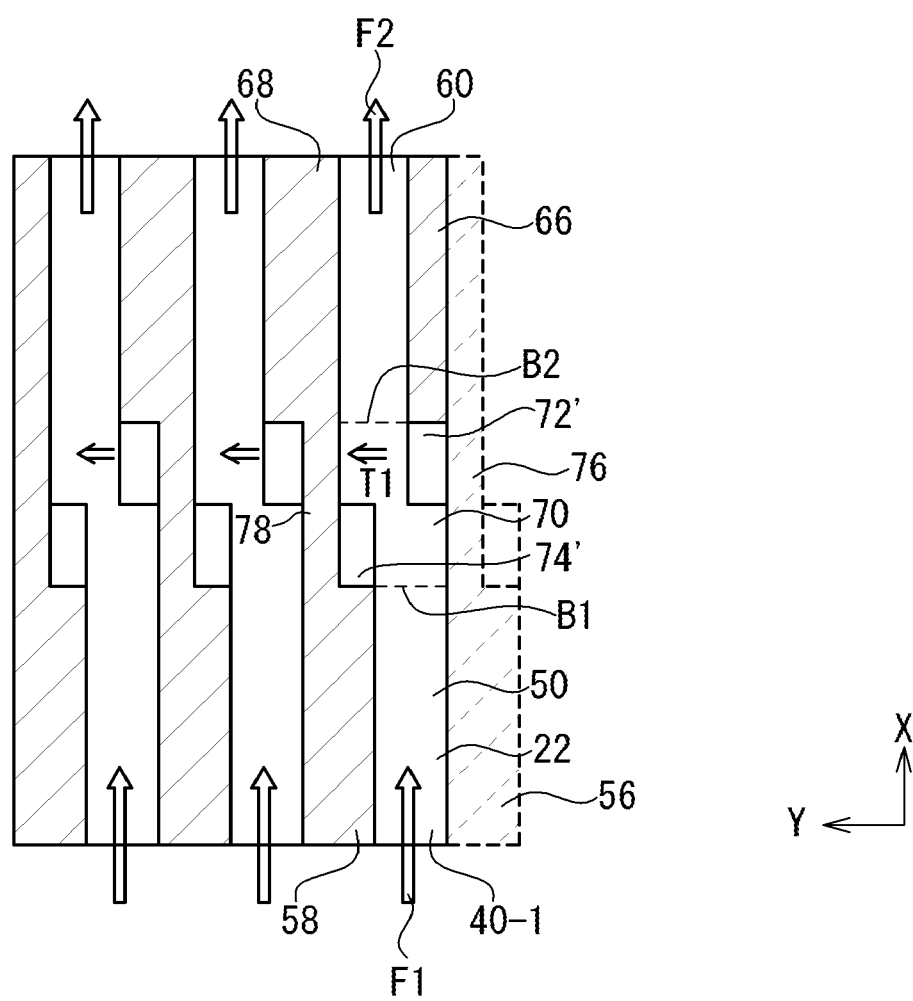
FIG. 5C is a plan view of the part of the cooling mechanism shown in FIG. 5B and is a diagram when the upper wall is omitted.
Figure 5D:
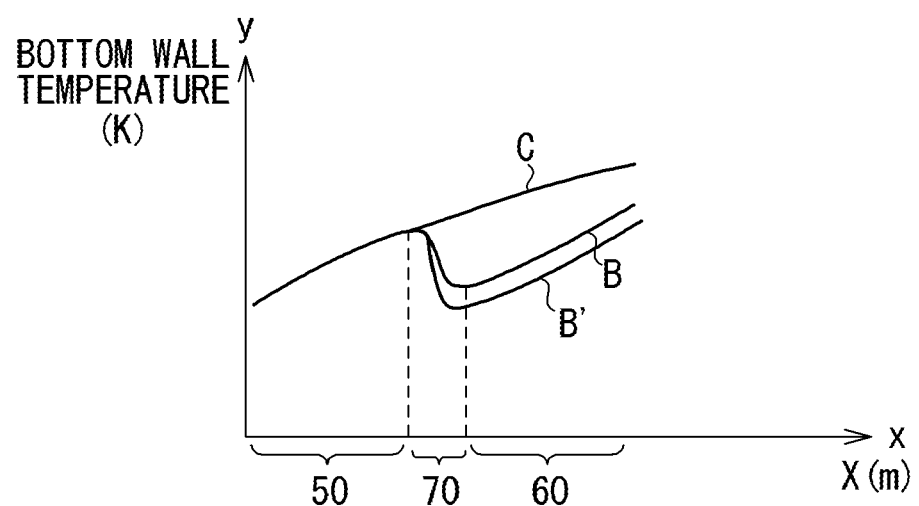
FIG. 5D is a graph schematically showing a temperature distribution of the bottom wall.
Figure 5E:
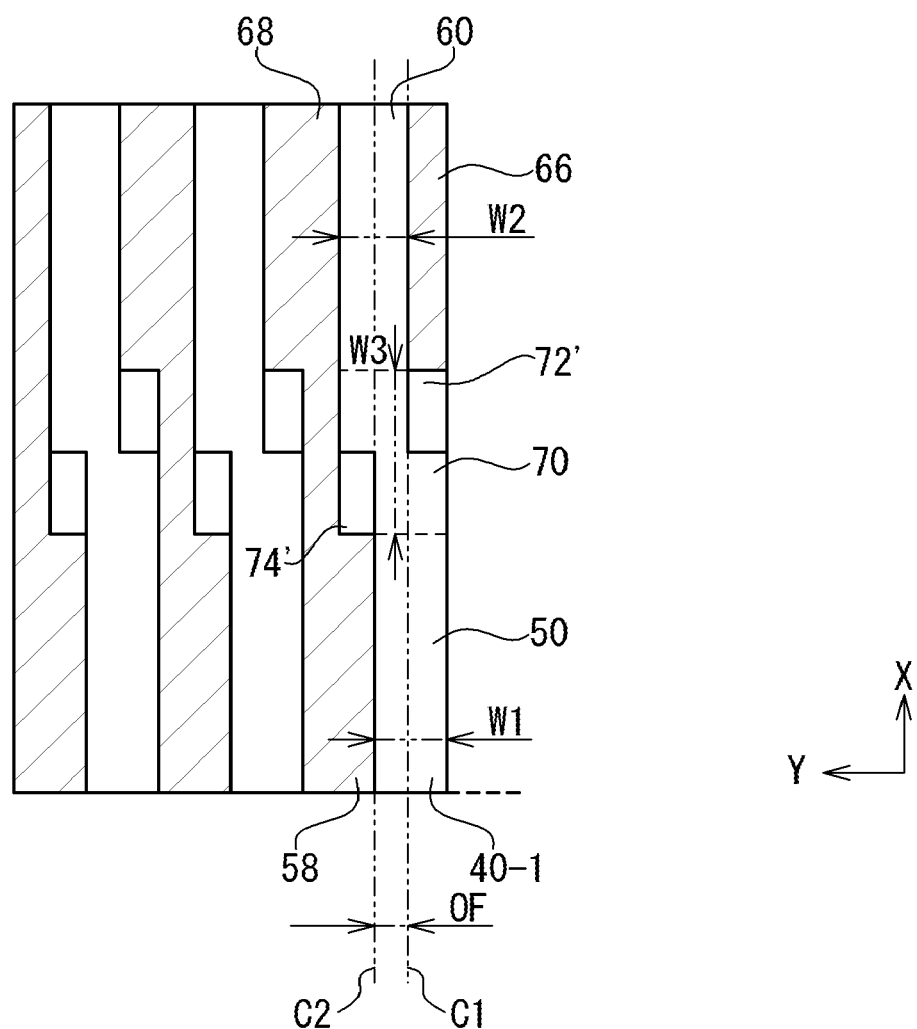
FIG. 5E is a diagram showing an offset distance.
Figure 5F:
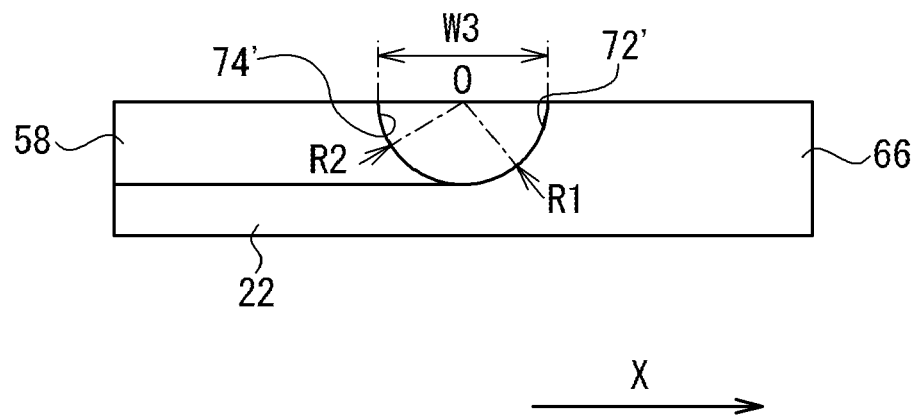
FIG. 5F is a diagram showing a distance in a direction along the X axis between a first collision wall and a second collision wall.
Figure 5G:
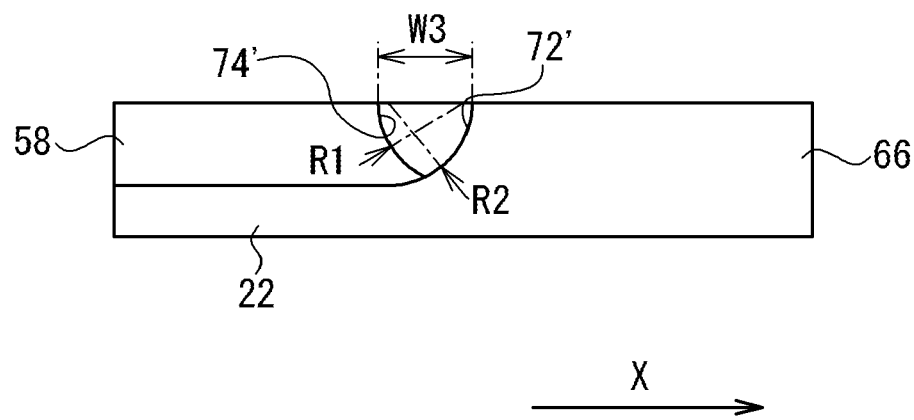
FIG. 5G is a diagram showing the distance in a direction along the X axis between a first collision wall and a second collision wall.

Referring to FIG. 5A to FIG. 5G, a modification example of the collision wall will be described. FIG. 5A is a schematic perspective view showing a part of the cooling mechanism. FIG. 5B is a schematic perspective view showing a part of the cooling mechanism and is a diagram when the upper wall is omitted. FIG. 5C is a plan view of the part of the cooling mechanism shown in FIG. 5B, and is a diagram when the upper wall is omitted. FIG. 5D is a graph schematically showing a temperature distribution of the bottom wall. FIG. 5E is a diagram showing an offset distance. FIG. 5F and FIG. 5G are diagrams showing the distance along the X direction between the first collision wall and the second collision wall.

FIG. 5A is a schematic perspective view showing a part of the cooling mechanism. The cooling mechanism 10 has a plurality of cooling passages 40 which include the first cooling passage 40-1, the second cooling passage 40-2, and the third cooling passage 40-3. Note that in FIG. 5A, cooling passages except for the first cooling passage 40-1, the second cooling passage 40-2, and the third cooling passage 40-3 are omitted to avoid the complication of the drawing. That is, actually, a cooling passage is provided through the side wall in the −Y direction of the first cooling passage 40-1, a cooling passage is provided in the +Y direction through the side wall of the third cooling passage 40-3. However, these passages are omitted.

Each of the first cooling passages 40-1, the second cooling passages 40-2, and the third cooling passages 40-3 is arranged between the bottom wall 22 and the upper wall 30. In detail, the first cooling passage 40-1 is a passage surrounded by the bottom wall 22, the upper wall 30 and the two side walls 26 (note that one of the side walls is omitted). In the same way, the second cooling passage 40-2 is a passage surrounded by the bottom wall 22, the upper wall 30 and the two side walls 26. Also, the third cooling passage 40-3 is a passage surrounded by the bottom wall 22, the upper wall 30 and the two side walls 26. The bottom wall 22 is in contact with the combustion chamber 4. In other words, the bottom surface of the bottom wall faces directly to a combustion space as the combustion chamber 4. Note that in FIG. 5A, the bottom surface of the bottom wall 22 has a shape corresponding to the shape of the combustion chamber 4. For example, when the shape of the combustion chamber is circularly cylindrical, the bottom surface of the bottom wall 22 has a curved surface corresponding to the side surface of the cylindrical shape.

FIG. 5A shows an example in which the bottom wall 22 and the plurality of side walls 26 are formed from one member. However, the embodiment is not limited to such an example. For example, the bottom wall 22 may be divided into a plurality of parts.

In an example of FIG. 5A, the shape of a first collision wall 72' is different from the shape of the first collision wall in FIG. 3A.

Cooling Passage

FIG. 5B is a schematic perspective view showing a part of the cooling mechanism, and is a diagram when the upper wall is omitted 30 shown in FIG. 5A. An example in which the shape of the first cooling passage 40-1, the shape of the second cooling passage 40-2 and the shape of the third cooling passage 40-3 are identical is shown in FIG. 5B. The second cooling passage 40-2 when being virtually translated in parallel to the −Y direction coincides with the first cooling passage 40-1. The third cooling passage 40-3 when being virtually translated in parallel to the −Y direction coincides with the first cooling passage 40-1. Therefore, only the first cooling passage 40-1 will be described. The first cooling passage 40-1 is a cooling passage arranged between the bottom wall 22 which is in contact with the combustion chamber 4, and the upper wall (not shown in FIG. 5B).

The first cooling passage 40-1 has the first passage 50 arranged along the bottom wall 22 to extend to the +X direction (in other words, the first direction). Also, the first cooling passage 40-1 has the second passage 60 arranged along the bottom wall 22 to extend to the +X direction (in other words, the first direction). The second passage 60 is arranged to have an offset in the direction along the Y axis to the first passage 50 (i.e. the second direction).

The first cooling passage 40-1 has the connection section 70 arranged between the first passage 50 and the second passage 60 in the direction along the X axis. The connection section 70 can be referred to as the connection passage. The connection section 70 is connected with the first passage 50 and the second passage 60. The first passage 50 is connected with the side of the connection section 70 in the −X direction (in the direction opposite to the first direction). Also, the second passage 60 is connected with a side of the connection section 70 in the +X direction (the first direction).

In the side of the connection section 70 in the +X direction (the first direction), a first collision wall 72' is arranged to collide with a part of the cooling medium which flows through the connection section 70 to the +X direction (the first direction). In the side of the connection section 70 in the −X direction (the direction opposite to the first direction), a second collision wall 74' is arranged to collide with a part of the cooling medium which flows through the connection section 70 to the −X direction (the direction opposite to the first direction).

The first collision wall 72' has a surface far from the bottom wall 22 as proceeding for the +X direction (the first direction). In more detail, the first collision wall 72' has a curved surface (the surface of an arc shape as an example). That is, the cross section of the first collision wall 72' along a plane perpendicular to the Y axis (in other words, the cross section perpendicular to the second direction) has a curved line.

The second collision wall 74' has a surface becoming near the bottom wall 22 as heading for the +X direction (the first direction). In more detail, the second collision wall 74' has a curved surface (an arc-shaped surface as an example). That is, the cross section of the second collision wall 74' along a plane perpendicular to the Y axis (in other words, the cross section perpendicular to the second direction) has a curved line. In an example of FIG. 5B, the shape of the second collision wall is identical to the shape of the first collision wall. However, the embodiment is not limited to such an example. The shape of the second collision wall may be different from the shape of the first collision wall. As the shape of the second collision wall, the shape of the second collision wall 74 shown in FIG. 3B may be adopted, the shape of a second collision wall 74" shown in FIG. 6A may be adopted, or another shape may be adopted.

The cooling medium which flows through the first passage 50 to the +X direction flows into the connection section 70 from the side of the connection section 70 in the −X direction. A part of the cooling medium which flows into the connection section 70 and flows through the connection section 70 to the +X direction collides with the first collision wall 72'. A momentum component is given to the cooling medium through the collision to advance toward the directions except for the +X direction, and the cooling medium is stirred. The momentum component proceeding toward the direction except for the X direction is typically a momentum component along the Y axis (i.e., the momentum component of the second direction), and also, is the momentum component proceeding toward the +Z direction.

The momentum component in the +Z direction which is generated by collision of the cooling medium with the first collision wall 72' generates a rotary flow RT rotating around the Y axis in the connection section 70. The cooling medium with a higher temperature which flows through a region near the bottom wall 22 moves to a direction apart from the bottom wall 22 by the rotary flow RT, and the cooling medium with a lower temperature which flows through the region far from the bottom wall 22 moves to the direction approaching the bottom wall 22. As a result, in the connection section 70, the temperature inclination of the cooling medium in a direction of the Z axial is effectively eased.

The cooling medium in which the temperature inclination has been effectively eased in the connection section 70 flows into the second passage 60. Almost of the cooling medium F2 which flows through the second passage 60 moves to the +X direction. Note that the cooling medium F2 flowing through the second passage 60 after passing through the connection section 70 has a large degree of turbulence, compared with the cooling medium F1 which flows to the +X direction in the first passage 50.

In an example of FIG. 5B, the first collision wall 72' becomes far from the bottom wall 22 as proceeding for the +X direction (the first direction). Therefore, the rotary flow RT is effectively generated.

Also, in the example of FIG. 5B, the second collision wall 74' becomes near the bottom wall 22 as proceeding for the +X direction (the first direction). Therefore, the rotary flow RT is effectively maintained.

Note that in the example shown in FIG. 5B, the flow direction of combustion gas G in the combustion chamber 4 is the +X direction. However, the flow direction of combustion gas G is not limited to the example of FIG. 5B and is optional.

FIG. 5C is a plan view of a part of the cooling mechanism shown in FIG. 5B, and is a diagram when the upper wall is omitted. Note that the side wall of the first cooling passage 40-1 in the −Y direction is shown by the broken line in FIG. 5C (that is, the side wall omitted in FIG. 5B).

In an example of FIG. 5C, the first passage 50 is a passage surrounded by the first side wall 56, the second side wall 58, the bottom wall 22 and the upper wall (not shown in FIG. 5C). Also, the connection section 70 (the connection passage) is a part surrounded by the first side wall 76, the second side wall 78, the bottom wall 22, the upper wall (not shown in FIG. 5C), a first boundary surface section B1, a second boundary surface section B2, the first collision wall 72' and the second collision wall 74'. Also, the second passage 60 is a passage surrounded by the first side wall 66, the second side wall 68, the bottom wall 22 and the upper wall (not shown in FIG. 5C). Note that in the example of FIG. 5C, a region hatched by slanted lines shows a region where the side wall exists, and the region where the cooling medium does not exist.

The cooling medium F1 which flows through the first passage 50 flows into the connection section 70 through the first boundary surface section B1 between the first passage 50 and the connection section 70. A momentum component T1 for the +Y direction and a momentum component for the +Z direction are given to the cooling medium, which flows through the connection section 70, by the first collision wall 72'. Due to the rotary flow RT caused by the collision with the first collision wall 72', a part of the cooling medium collides with the second collision wall 74'. The rotary flow RT is effectively maintained by the second collision wall 74'. The cooling medium which flows through the connection section 70 flows into the second passage 60 through the second boundary surface section B2 between the connection section 70 and the second passage 60.

FIG. 5D is a graph schematically showing a temperature distribution of the bottom wall. The x-axis of FIG. 5D shows the position of the bottom wall 22 along the +X direction (unit: meter). The y axis of FIG. 5D shows the temperature (unit: Kelvin) of the bottom wall 22. In FIG. 5D, a curve shown by "B" shows a temperature change of the bottom wall when the cooling mechanism of the embodiments shown in FIG. 3A to FIG. 3C is adopted. A curve shown by "B'" shows a temperature change of the bottom wall when the cooling mechanism of the embodiment shown in FIG. 5A to FIG. 5C is adopted. A curve specified by "C" shows a temperature change of the bottom wall when the first passage and the second passage are not arranged to have an offset.

In the example of FIG. 5A to FIG. 5C, the rotary flow RT is effectively caused in the connection section 70. Therefore, in the example of FIG. 5A to FIG. 5C, the cooling efficiency of the bottom wall by the cooling mechanism is more improved, compared with the embodiment shown in FIG. 3A to FIG. 3C.

Offset Distance

Referring to FIG. 5E, an offset distance will be described. FIG. 5E is a plan view of a part of the cooling mechanism shown in FIG. 5B and is a diagram when the upper wall is omitted.

A longitudinal center axis of the first passage 50 is defined as a central axis C1, and a longitudinal center axis of the second passage 60 is defined as a central axis C2. At this time, a distance between the central axis C1 and the central axis C2 is an offset distance OF. In other words, the distance between the longitudinal center axis C1 of the first passage 50 and the longitudinal center axis C2 of the second passage 60 in a second direction (the direction along the Y axis) which is perpendicular to the +X direction (the first direction) and along the bottom wall 22 can be defined as an offset distance OF.

The offset distance OF is, for example, smaller than the width W1 of the first passage 50 in the direction along the Y axis (the second direction). By making the offset distance OF smaller than the width W1, a part of the first passage 50 overlaps with a part of the second passage 60 when viewing to the +X direction. In other words, a part of the cooling medium which flows through the first passage 50 to the +X direction proceeds to the +X direction through the connection section 70 without colliding with the first collision wall 72', and is possible to flow into the second passage 60. In this case, the decline of the flow speed of the cooling medium due to existence of the connection section 70 or the pressure loss of the cooling medium is reduced. The decline of flow speed of the cooling medium causes the decline of the heat transfer coefficient of the cooling medium. In an example of FIG. 5E, since the offset distance OF is smaller than the width W1, the decline of flow speed of the cooling medium is restrained and the decline of the heat transfer coefficient of the cooling medium is restrained. As a result, the cooling efficiency by the cooling mechanism is more improved.

Note that the width W2 of the second passage 60 in the direction along the Y axis (the second direction) is, for example, equal to the width W1 of the first passage.

Distance in X Direction Between First Collision Wall and Second Collision Wall

FIG. 5F and FIG. 5G are diagrams showing the distance in the X direction between the first collision wall 72' and the second collision wall 74'.

The radius of curvature of the first collision wall 72' is defined as radius R1, and the radius of curvature of the second collision wall 74' is defined as radius R2. In the example of FIG. 5F, the radius R1 and the radius R2 coincide with each other. Also, the central axis O of an arc surface of the first collision wall 72' and the central axis O of an arc surface of the second collision wall 74' coincide with each other. Therefore, in the example of FIG. 5F, the rotary flow RT is effectively generated and is maintained.

Also, in the example of FIG. 5F, a distance W3 between the upper end of the first collision wall 72' and the upper end of the second collision wall 74' is equal to a summation of the radius R1 and the radius R2 (in other words, the distance W3 between the upper end of the first collision wall 72' and the upper end of the second collision wall 74' is equal to twice of the radius R1). In this case, as understood from FIG.

5E, the area of cross section of the connection section 70 perpendicular to the X axis is larger than the area of cross section of the first passage 50 perpendicular to the X axis. When the cross section area of the passage becomes large, the flow speed declines. Therefore, the flow speed of the cooling medium in the connection section 70 is smaller than the flow speed of the cooling medium of the first passage 50. According to the decline of the flow speed, there is a fear that cooling efficiency of the bottom wall 22 in the connection section 70 declines.

An example of means for restraining the decline of flow speed of the cooling medium in the connection section 70 is shown in FIG. 5G. In the example of FIG. 5G, the distance W3 between the upper end of the first collision wall 72' and the upper end of the second collision wall 74' is smaller than a summation of the radius R1 and the radius R2 (in other words, the distance W3 between the upper end of the first collision wall 72' and the upper end of the second collision wall 74' is smaller than twice of the radius R1). When using another representation, in the example of FIG. 5G, the position of the lower end of the second collision wall 74' in the direction along the X axis is in the +X direction (the first direction), compared with the position of the lower end of the first collision wall 72' in the direction along the X axis. That is, when viewing the first collision wall 72' and the second collision wall 74' in the direction along the Y axis, the first collision wall 72' and the second collision wall 74' intersect each other. Therefore, the maximum value of the area of cross section, perpendicular to the X axis, of the connection section 70 shown in FIG. 5G is smaller than the maximum value of the area of cross section, perpendicular to the X axis, of the connection section 70 shown in FIG. 5F. As a result, in the example shown in FIG. 5G, the decline of flow speed of the cooling medium in the connection section 70 is restrained.

Note that the distance W3 between the upper end of the first collision wall 72' and the upper end of the second collision wall 74' is equal to the length of the connection section 70 in the +X direction (the first direction).

Second Modification Example of Collision Wall

Figure 6A:
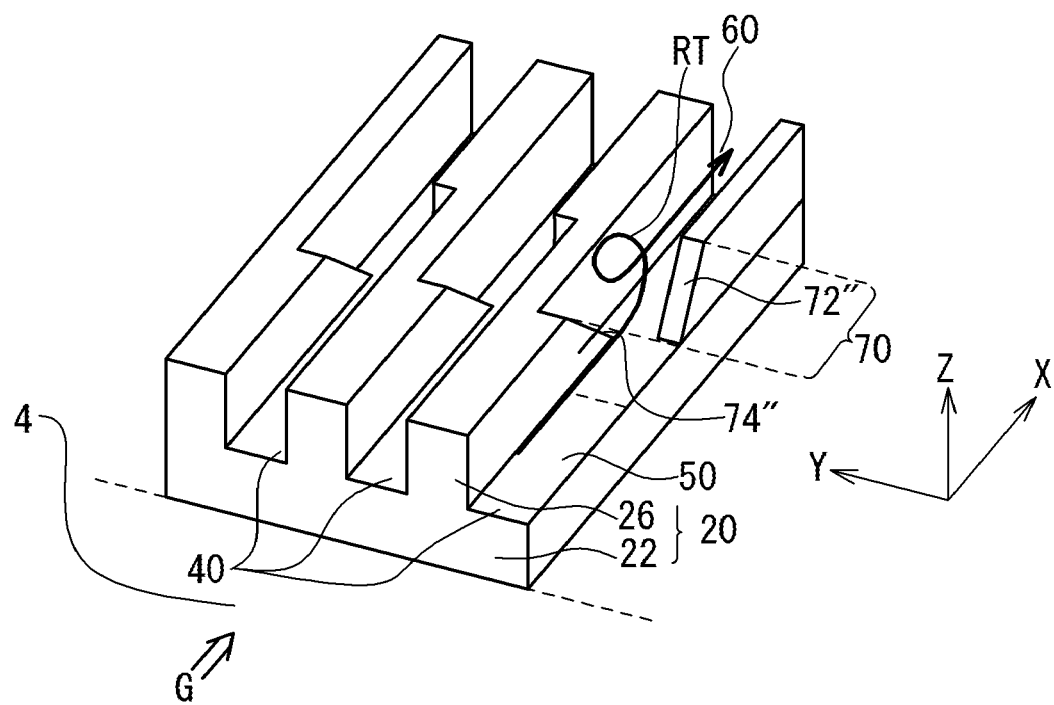
FIG. 6A is a schematic perspective view showing a part of the cooling mechanism and is a diagram when the upper wall is omitted.
Figure 6B:
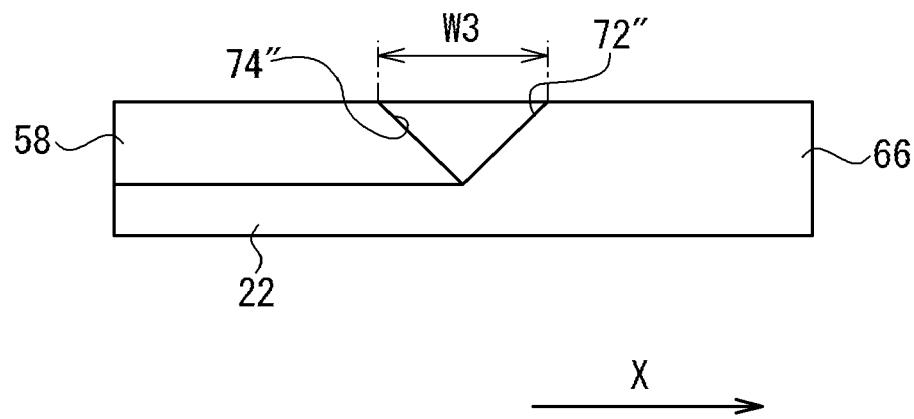
FIG. 6B is a side view of a part of the cooling mechanism shown in FIG. 6A and is a diagram when the upper wall is omitted.
Figure 6C:
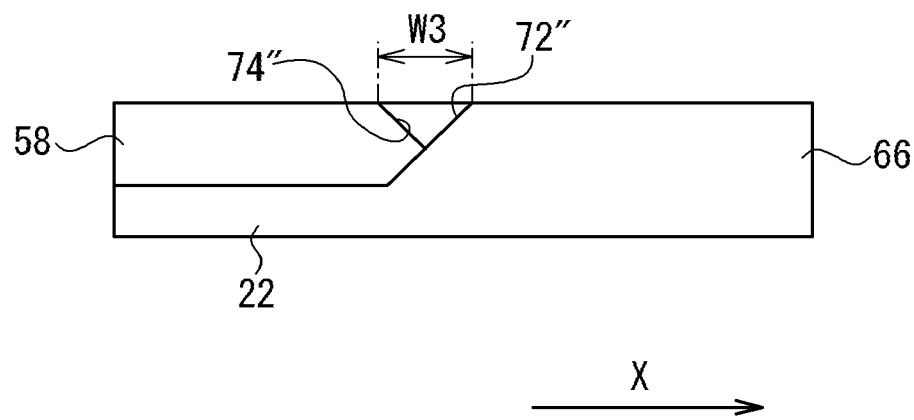
FIG. 6C is a side view of a part of the cooling mechanism and is a diagram when the upper wall is omitted.

Referring to FIG. 6A to FIG. 6C, a second modification example of the collision wall will be described. In the example shown in FIG. 6A to FIG. 6C, the shape of a first collision wall 72" and the shape of a second collision wall 74" are different from those of the examples of FIG. 5A to FIG. 5G. The other components in the example shown in FIG. 6A to FIG. 6C are same as those in the example shown in FIG. 5A to FIG. 5G.

FIG. 6A is a schematic perspective view showing a part of the cooling mechanism and is a diagram when the upper wall is omitted. FIG. 6B is a side view of the part of the cooling mechanism shown in FIG. 6A and a diagram when the upper wall is omitted.

In the example shown in FIG. 6A and FIG. 6B, the first collision wall 72" has a surface far from the bottom wall 22 as proceeding for the +X direction (the first direction). In more detail, the first collision wall 72" has an even slope.

The second collision wall 74" has a surface approaching the bottom wall 22 as proceeding for the +X direction (the first direction). In more detail, the second collision wall 74" has an even slope. In the example shown in FIG. 6A and FIG. 6B, the shape of the second collision wall is identical to the shape of the first collision wall. However, the embodiment is not limited to such an example. The shape of the second collision wall may be different from the shape of the first collision wall. As the shape of the second collision wall, the shape of the second collision wall 74 shown in FIG. 3B may be adopted, the shape of the second collision wall 74' shown in FIG. 5B may be adopted, or another shape may be adopted.

The rotary flow RT is effectively caused by the first collision wall 72" in FIG. 6A and FIG. 6B. Also, the rotary flow RT is effectively maintained by the second collision wall 74" in FIG. 6A and FIG. 6B. Therefore, in the example of FIG. 6A and FIG. 6B, the cooling efficiency by the cooling mechanism is more improved, compared with the embodiment shown in FIG. 3A to FIG. 3C.

Distance in X Direction Between First Collision Wall and Second Collision Wall

FIG. 6B and FIG. 6C are diagrams showing the distance in the X direction between the first collision wall and the second collision wall.

In the example shown in FIG. 6B, the position of the lower end of the first collision wall 72" in the direction along the X axis is equal to the position of the lower end of the second collision wall 74" in the direction along the X axis. In this case, as understood from FIG. 6A, the area of cross section of the connection section 70 perpendicular to the X axis is larger than the area of cross section of the first passage 50 perpendicular to the X axis. When the area of cross section of the passage becomes large, the flow speed declines. Therefore, the flow speed of the cooling medium in the connection section 70 is smaller than the flow speed of the cooling medium in the first passage 50. There is a fear that the cooling efficiency of the bottom wall 22 in the connection section 70 declines due to the decline of flow speed.

An example of means for restraining the decline of flow speed of the cooling medium in the connection section 70 is shown in FIG. 6C. In the example of FIG. 6C, the position of the lower end of the second collision wall 74" in the direction along the X axis is in the +X direction (the side of the first direction), compared with the position of the lower end of the first collision wall 72" in the direction along the X axis. In other words, when viewing the first collision wall 72" and the second collision wall 74" in a direction along in the Y axis, the first collision wall 72" and the second collision wall 74" intersect each other. Therefore, the maximum value of the area of cross section, perpendicular to the X axis, of the connection section 70 shown in FIG. 6C is smaller than the maximum value of the area of cross section, perpendicular to the X axis, of the connection section 70 shown in FIG. 6B. As a result, in the example shown in FIG. 6C, the decline of flow speed of the cooling medium in the connection section 70 is restrained.

Note that the distance W3 between the upper end of the first collision wall 72" and the upper end of the second collision wall 74" is equal to the length of the connection section 70 in the +X direction (the first direction). By setting the distance W3 appropriately, it is possible to equalize the area of cross section of the connection section 70 perpendicular to the X axis and the area of cross section of the first passage 50 perpendicular to the X axis. Also, by setting the distance W3 appropriately, it is possible to equalize the area of cross section of the connection section 70 perpendicular to the X axis and the area of cross section of the second passage 60 perpendicular to the X axis. When the area of cross section of the connection section 70 perpendicular to the X axis and the area of cross section of the first passage 50 perpendicular to the X axis are equal to each other, the decline of flow speed of the cooling medium in the connection section 70 is most restrained.

Third Modification Example of Collision Wall

Figure 7A:
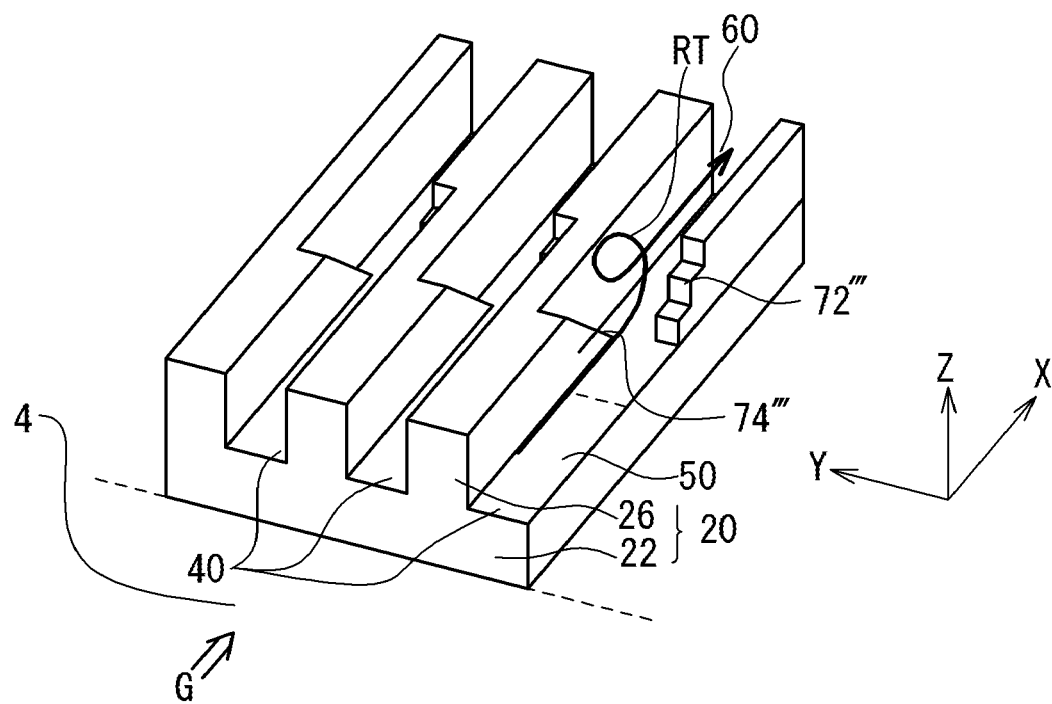
FIG. 7A is a schematic perspective view showing a part of the cooling mechanism and is a diagram when the upper wall is omitted.
Figure 7B:
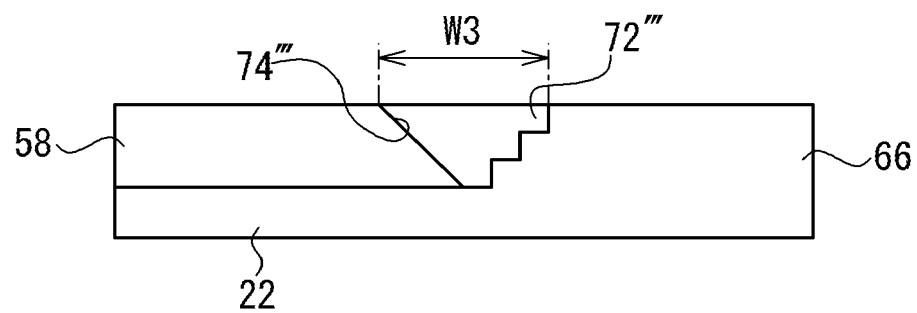
FIG. 7B is a side view of the part of the cooling mechanism shown in FIG. 7A and is a diagram when the upper wall is omitted.

Referring to FIG. 7A and FIG. 7B, a third modification example of the collision wall will be described. In the example shown in FIG. 7A and FIG. 7B, the shape of a first collision wall 72''' is different from that of the example shown in FIG. 6A to FIG. 6C. The other components in the example shown in FIG. 7A and FIG. 7B are same as those of the example shown in FIG. 6A to FIG. 6C.

FIG. 7A is a schematic perspective view showing a part of the cooling mechanism and is a diagram when the upper wall is omitted. FIG. 7B is a side view of the part of the cooling mechanism shown in FIG. 7A and is a diagram when the upper wall is omitted.

In the example shown in FIG. 7A and FIG. 7B, the first collision wall 72''' has a step-like surface far from the bottom wall 22 as proceeding for the +X direction (the first direction).

The shape of a second collision wall 74''' in the example shown in FIG. 7B is identical to the shape of the second collision wall 74'' in the example shown in FIG. 6B. Alternatively, the shape of the second collision wall may be identical to the shape of the first collision wall 72'''. Further alternatively, as the shape of the second collision wall, the shape of the second collision wall 74 shown in FIG. 3B may be adopted, or the shape of the second collision wall 74' shown in FIG. 5B may be adopted.

In the example shown in FIG. 7A and FIG. 7B, the rotary flow RT is effectively caused by the first collision wall 72'''. Also, the rotary flow RT is effectively maintained by the second collision wall 74'''. Therefore, in the example shown in FIG. 7A and FIG. 7B, the cooling efficiency by the cooling mechanism is improved.

Downstream Side of Second Passage

Figure 8A:
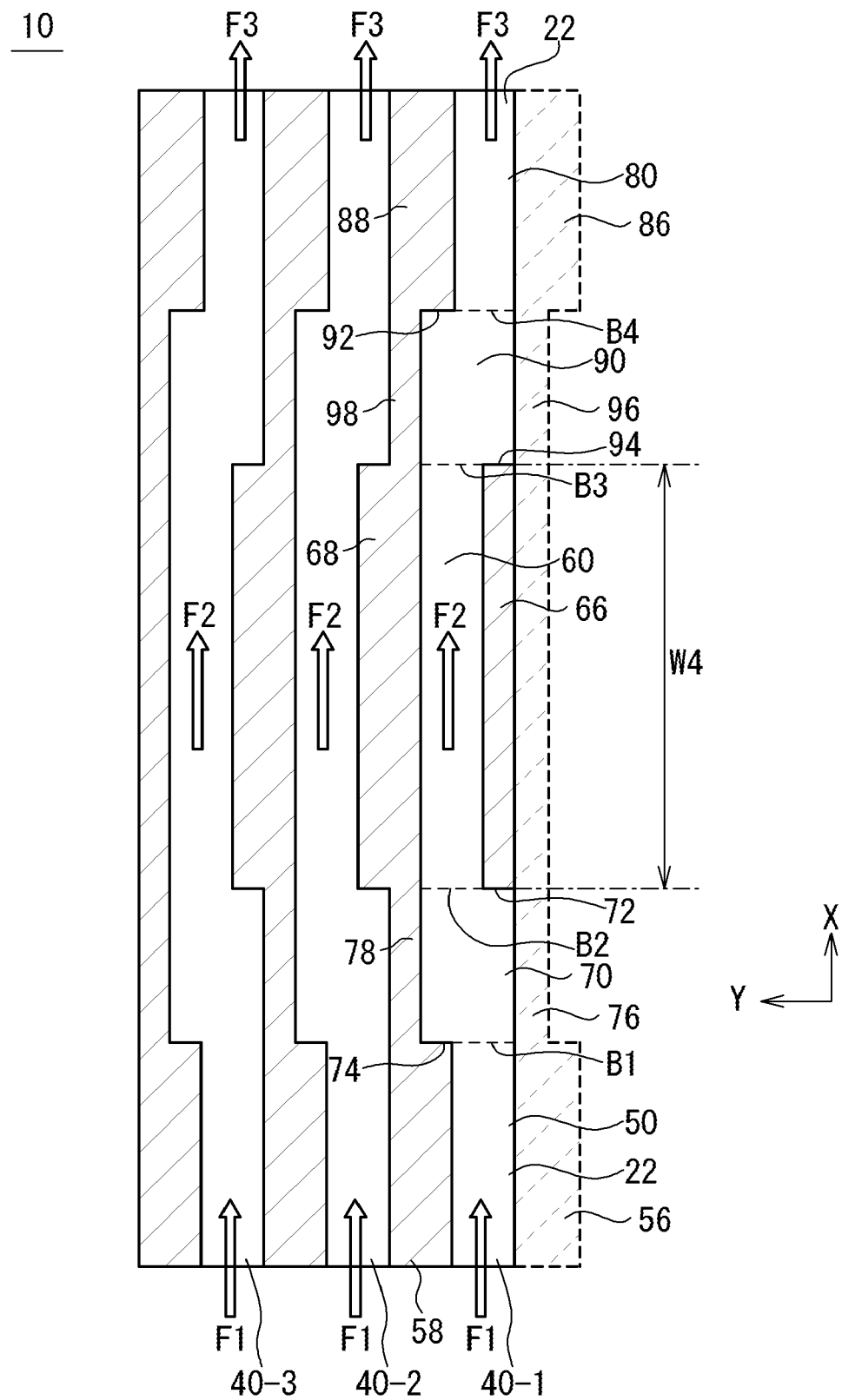
FIG. 8A is a plan view of a part of the cooling mechanism and is a diagram when the upper wall is omitted.

A third passage 80 arranged on the downstream of the second passage 60 is shown in FIG. 8A. FIG. 8A is a plan view of a part of the cooling mechanism and is a diagram when the upper wall is omitted.

The first passage 50 and the second passage 60 in FIG. 8A may be identical to any of the first passage 50 and the second passage 60 shown in FIG. 3A to FIG. 3C, the first passage 50 and the second passage 60 shown in FIG. 5A to FIG. 5G, the first passage 50 and the second passage 60 shown FIG. 6A to FIG. 6C, and the first passage 50 and the second passage 60 shown in FIG. 7 and FIG. 7B.

The cooling mechanism 10 has a plurality of cooling passages 40 which contain the first cooling passage 40-1, the second cooling passage 40-2, and the third cooling passage 40-3. Note that in FIG. 8A, cooling passages except for the first cooling passage 40-1, the second cooling passage 40-2, and the third cooling passage 40-3 are omitted to avoid the complication of the drawing. That is, actually, a cooling passage is provided in the −Y direction of the first cooling passage 40-1 through the side wall. A cooling passage is provided in the +Y direction of the third cooling passage 40-3 through the side wall. However, these passages are omitted in the drawing.

Each of the first cooling passages 40-1, the second cooling passages 40-2, and the third cooling passages 40-3 is arranged between the bottom wall 22 and the upper wall 30 (not shown in FIG. 8A).

In FIG. 8A, an example will be described in which the shape of the first cooling passage 40-1, the shape of the second cooling passage 40-2 and the shape of the third cooling passage 40-3 are identical to each other. If being virtually translated in parallel to the −Y direction, the second cooling passage 40-2 coincides with the first cooling passage 40-1. If being virtually translated in parallel to the −Y direction, the third cooling passage 40-3 coincides with the first cooling passage 40-1. Therefore, only the first cooling passage 40-1 will be described in this case. The first cooling passage 40-1 is a cooling passage surrounded by the bottom wall 22 in contact with the combustion chamber 4, the upper wall (not shown in FIG. 8A) and the two side walls.

The first passage 50 and the second passage 60 are same as the first passage 50 and the second passage 60 shown in FIG. 3A to FIG. 7B. Therefore, the description is omitted. A second connection section 90 and a third passage 80 are mainly described.

The first cooling passage 40-1 includes the third passage 80 arranged along the bottom wall 22 to extend along the +X direction (in other words, the first direction). The third passage 80 is arranged to have an offset in the direction along the Y axis (i.e. the second direction) to the second passage 60. In the example shown in FIG. 8A, the third passage 80 is a passage which is surrounded by a first side wall 86, a second side wall 88, the bottom wall 22 and the upper wall (not shown in FIG. 8A).

The first cooling passage 40-1 has a second connection section 90 arranged between the second passage 60 and the third passage 80 in the direction along the X axis. The second connection section 90 can be also called a second connection passage. The second connection section 90 is connected with the second passage 60 and is connected with the third passage 80. The second passage 60 is connected with the side of the second connection section 90 in the −X direction (the direction opposite to the first direction). Also, the third passage 80 is connected with a part of the second connection section 90 in the +X direction (the first direction). The second connection section 90 (the second connection passage) is a part surrounded by a first side wall 96, a second side wall 98, the bottom wall 22, the upper wall (not shown in FIG. 8A), a third boundary surface section B3, a fourth boundary surface section B4, a third collision wall 92 and a fourth collision wall 94.

The third collision wall 92 is arranged in the end of the second connection section 90 in the +X direction (the first direction) such that a part of the cooling medium which flows through the second connection section 90 to the +X direction (the first direction) collides with the third collision wall 92. Also, the fourth collision wall 94 is arranged in the end of the second connection section 90 in the −X direction (the direction opposite to the first direction) such that a part of the cooling medium which flows through the second connection section 90 to the −X direction (the direction opposite to the first direction) collides with the fourth collision wall 94.

The shape of the third collision wall 92 may be identical to the shape of the first collision wall 72 shown in FIG. 3B, may be identical to the shape of the first collision wall 72' shown in FIG. 5B, may be identical to the shape of the first collision wall 72'' shown in FIG. 6A, or may be another shape.

The shape of the fourth collision wall 94 may be identical to the shape of the second collision wall 74 shown in FIG. 3B, may be identical to the shape of the second collision wall 74' shown in FIG. 5B, may be identical to the shape of the second collision wall 74" shown in FIG. 6A, or may be another shape.

The cooling medium F2 which flows through the second passage 60 to the +X direction flows into the second connection section 90 from the end of the second connection section 90 in the −X direction (the third boundary surface section B3). A part of the cooling medium which flows into the second connection section 90 and flows through the second connection section 90 to the +X direction collides with the third collision wall 92. A momentum component which heads for a direction except for the +X direction is given to the cooling medium by the collision, and the cooling medium is stirred. A momentum component which heads for a direction except for the X direction is typically a momentum component in the direction along the Y axis (i.e. the second direction), and a momentum component in the direction along the Z axis.

A part of the cooling medium which flows through the second connection section 90 collides with the third collision wall 92 so that the cooling medium is effectively stirred in the second connection section 90. As a result, the cooling efficiency of the bottom wall in the second connection section 90 is improved. The stirred cooling medium flows into the third passage 80 through the fourth boundary surface section B4. The cooling medium F3 which flows into the third passage flows through the third passage 80 to the +X direction. The cooling medium F3 which flows through the third passage is the cooling medium effectively stirred in the second connection section. Therefore, the cooling efficiency of the bottom wall in the third passage 80 is improved.

A length W4 in the direction along the X axis between the connection section 70 and the second connection section 90 is determined in consideration of a degree of the temperature inclination in the direction along the Z axis, of the cooling medium which flows through the second passage 60.

Figure 8B:
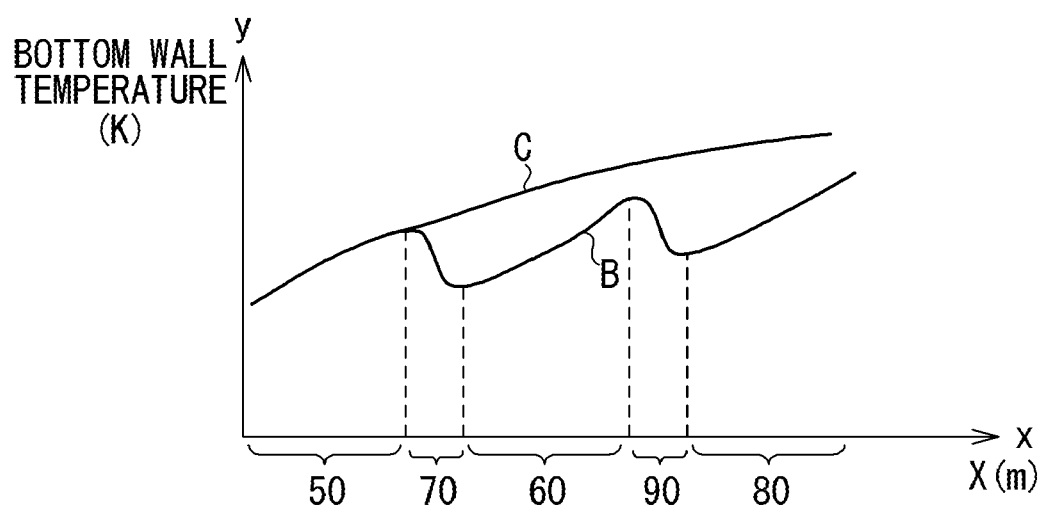
FIG. 8B is a graph schematically showing a temperature distribution of the bottom wall.

FIG. 8B is a graph schematically showing a temperature distribution of the bottom wall. The x-axis of FIG. 8B shows a position (the unit: meter) of the bottom wall 22 along the +X direction. The Y axis of FIG. 8B shows the temperature of the bottom wall 22 (the unit: Kelvin). In FIG. 8B, a curve shown by "B" shows a temperature change of the bottom wall when the cooling mechanism in the embodiment shown in FIG. 8A is adopted. A curve shown by "C" shows the temperature change of the bottom wall when the first passage and the second passage are not arranged to have an offset and when the second passage and the third passage are not arranged to have an offset.

Referring to FIG. 8B, it could be understood that the cooling medium is effectively stirred in the connection section 70 and the second connection section 90 so that the cooling efficiency of the bottom wall is improved.

Note that an example in which the second passage 60 is arranged to have an offset in the +Y direction to the first passage 50, and the third passage 80 is arranged to have an offset in the −Y direction to the second passage 60 is shown in FIG. 8A. That is, in the example of FIG. 8A, the direction of the offset of the second passage 60 to the first passage 50 is opposite to the direction of the offset of the third passage 80 to the second passage 60.

Figure 9:
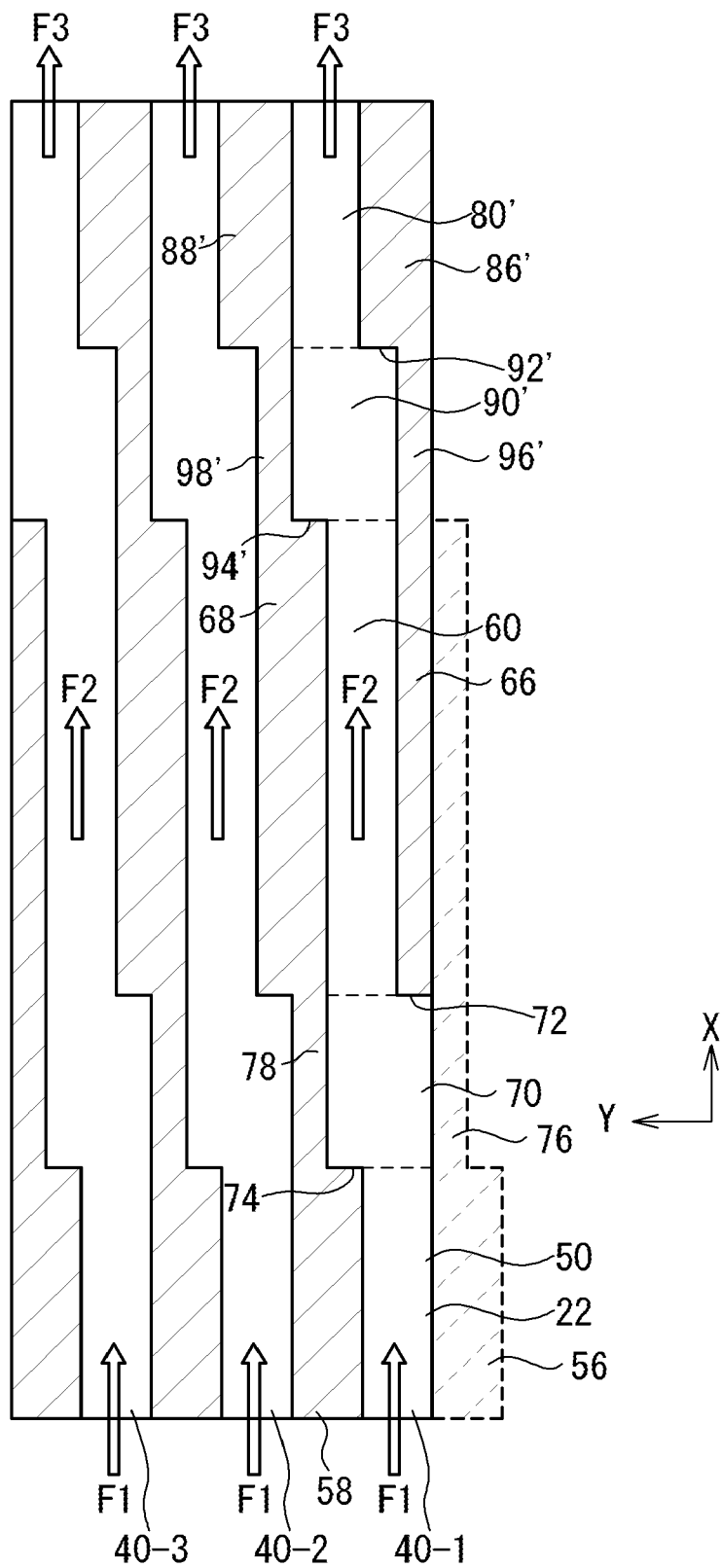
FIG. 9 is a plan view of a part of the cooling mechanism and is a diagram when the upper wall is omitted.

On the other hand, an example in is shown in FIG. 9 which the second passage 60 is arranged to have an offset in the +Y direction to the first passage 50 and the third passage 80 is arranged to have an offset in the +Y direction to the second passage 60. That is, the direction of the offset of the second passage 60 to the first passage 50 is the same as the direction of the offset of the third passage 80 to the second passage 60 in the example of FIG. 9. In the embodiment shown in FIG. 9, the cooling efficiency of the bottom wall is improved, like the embodiment shown in FIG. 8A.

Modification Example of Cooling Passage

Figure 10:
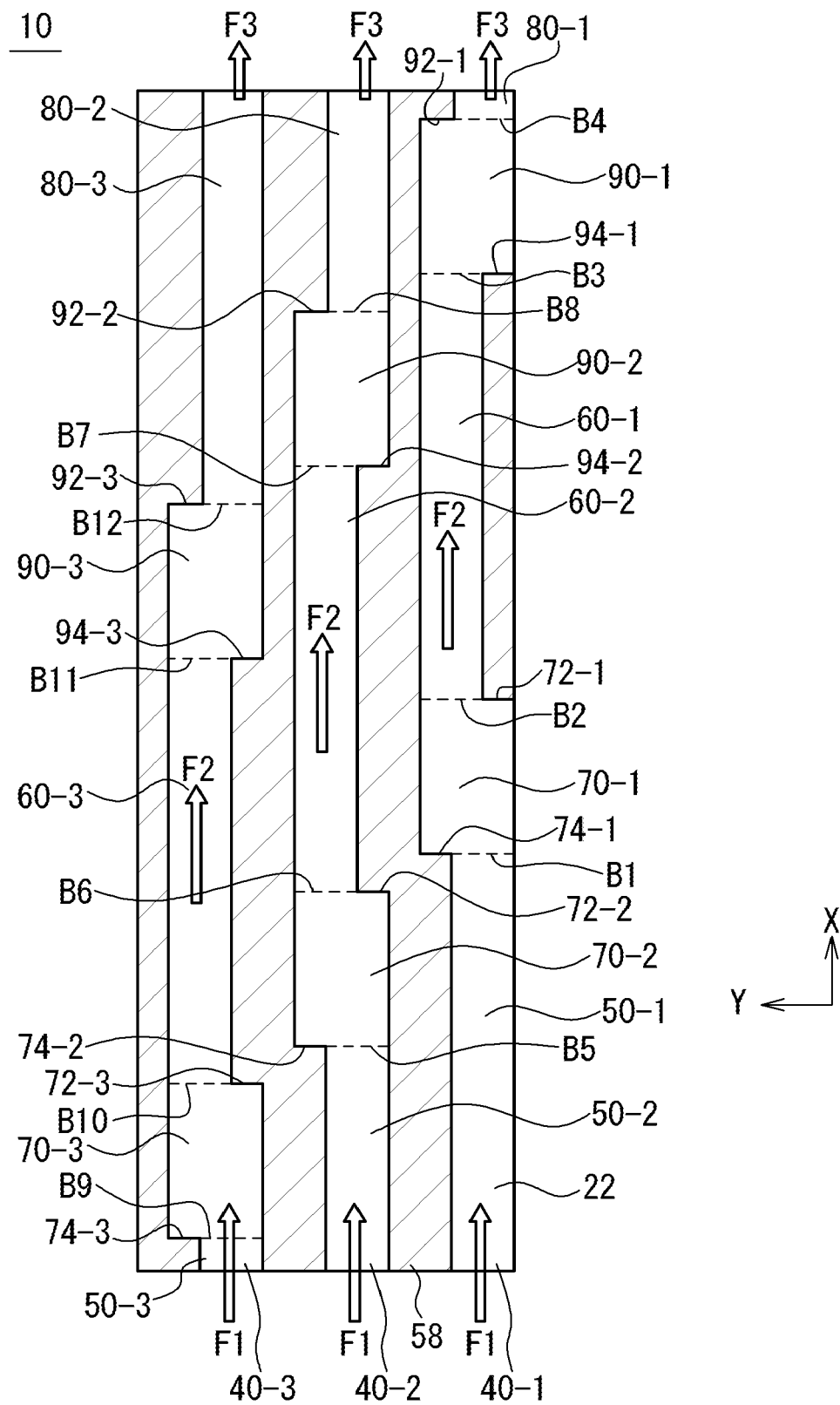
FIG. 10 is a plan view of a part of the cooling mechanism and is a diagram when the upper wall is omitted.

Referring to FIG. 10, a modification example of the cooling passage will be described. FIG. 10 is a plan view of a part of the cooling mechanism and is a diagram when the upper wall is omitted. The cooling mechanism 10 has a plurality of cooling passages 40 which contain the first cooling passage 40-1, the second cooling passage 40-2, and the third cooling passage 40-3. Note that the cooling passages except for the first cooling passage 40-1, the second cooling passage 40-2, and the third cooling passage 40-3 are omitted in FIG. 10 to avoid the complication of the drawing. That is, actually, a cooling passage is provided on the side of the first cooling passage 40-1 in the −Y direction through the side wall, and a cooling passage is provided on the side of the +Y direction of the third cooling passage 40-3 through the side wall. However, these passages are omitted.

In the example shown in FIG. 10, the first cooling passage 40-1 includes a first connection section 70-1 and a second connection section 90-1. Also, the second cooling passage 40-2 includes a third connection section 70-2 and a fourth connection section 90-2. Also, the third cooling passage 40-3 includes a fifth connection section 70-3 and a sixth connection section 90-3.

The first connection section 70-1 and the third connection section 70-2 are arranged to have an offset to each other in the direction along the X axis. The third connection section 70-2 and the fifth connection section 70-3 are arranged to have an offset to each other in the direction along the X axis. The second connection section 90-1 and the fourth connection section 90-2 are arranged to have an offset to each other in the direction along the X axis. The fourth connection section 90-2 and the sixth connection section 90-3 are arranged to have an offset to each other in the direction along the X axis.

Each of the first connection section 70-1, the second connection section 90-1, the third connection section 70-2, the fourth connection section 90-2, the fifth connection section 70-3, and the sixth connection section 90-3 has a collision wall and is a region in which that the area of cross section perpendicular to the X axis is relatively large. In other words, each of the first connection section 70-1, the second connection section 90-1, the third connection section 70-2, the fourth connection section 90-2, the fifth connection section 70-3, and the sixth connection section 90-3 is a region where there is a possibility that flow speed of the cooling medium declines. Therefore, there is a possibility that the cooling effect becomes insufficient to the bottom wall of the first connection section 70-1, the bottom wall of the second connection section 90-1, the bottom wall of the third connection section 70-2, the bottom wall of the fourth connection section 90-2, the bottom wall of the fifth connection section 70-3, and the bottom wall of the sixth connection section 90-3. In the example shown in FIG. 10, the plurality of connection sections are arranged to have offsets to each other in the direction along the X axis. Therefore, the region where there is a possibility that the cooling effect becomes insufficient is arranged distributedly in the X direction. Thus, the cooling of the whole bottom wall 22 becomes able to be more uniformly carried out.

In the example shown in FIG. 10, the first cooling passage 40-1 has a first passage 50-1, a first connection section 70-1, a second passage 60-1, a second connection section 90-1 and a third passage 80-1. The second passage 60-1 is arranged to have an offset in the +Y direction to the first passage 50-1. The third passage 80-1 is arranged to have an offset in the −Y direction to the second passage 60-1. The first connection section 70-1 has the first collision wall 72-1, the second collision wall 74-1, the first boundary surface section B1 (a boundary surface section between the first passage 50-1 and the first connection section 70-1), and the second boundary surface section B2 (a boundary surface section between the first connection section 70-1 and the second passage 60-1). The second connection section 90-1 has a first collision wall 92-1, a second collision wall 94-1, a third boundary surface section B3 (a boundary surface section between the second passage 60-1 and the second connection section 90-1), and a fourth boundary surface section B4 (a boundary surface section between the second connection section 90-1 and the third passage 80-1).

Also, the second cooling passage 40-2 has a fourth passage 50-2, the third connection section 70-2, a fifth passage 60-2, a fourth connection section 90-2 and a sixth passage 80-2. The fifth passage 60-2 is arranged to have an offset in the +Y direction to the fourth passage 50-2. The sixth passage 80-2 is arranged to have an offset in the −Y direction to the fifth passage 60-2. The third connection section 70-2 has a first collision wall 72-2, a second collision wall 74-2, a fifth boundary surface section B5 (a boundary surface section between fourth passage 50-2 and a third connection section 70-2) and a sixth boundary surface section B6 (a boundary surface section between the third connection section 70-2 and fifth passage 60-2). The fourth connection section 90-2 has a first collision wall 92-2, a second collision wall 94-2, a seventh boundary surface section B7 (a boundary surface section between the fifth passage 60-2 and the fourth connection section 90-2), and an eighth boundary surface section B8 (a boundary surface section between a fourth connection section 90-2 and a sixth passage 80-2).

The third cooling passage 40-3 has a seventh passage 50-3, a fifth connection section 70-3, an eighth passage 60-3, a sixth connection section 90-3 and a ninth passage 80-3. The eighth passage 60-3 is arranged to have an offset in the +Y direction to the seventh passage 50-3. The ninth passage 80-3 is arranged to have an offset in the −Y direction to the eighth passage 60-3. The fifth connection section 70-3 has the first collision wall 72-3, the second collision wall 74-3, the ninth boundary surface section B9 (a boundary surface section between the seventh passage 50-3 and the fifth connection section 70-3), and a tenth boundary surface section B10 (a boundary surface section between the fifth connection section 70-3 and the eighth passage 60-3). The sixth connection section 90-3 has a first collision wall 92-3, a second collision wall 94-3, an eleventh boundary surface section B11 (a boundary surface section between the eighth passage 60-3 and the sixth connection section 90-3), and a twelfth boundary surface section B12 (a boundary surface section between the sixth connection section 90-3 and the ninth passage 80-3).

Note that in the example shown in FIG. 10, the shape of each first collision wall may be identical to the shape of the first collision wall 72 shown in FIG. 3B, may be identical to the shape of the first collision wall 72' shown in FIG. 5B, may be identical to the shape of the first collision wall 72" shown diagram 6A, or may be another shape. Also, in the example shown in FIG. 10, the shape of each second collision wall may be identical to the shape of the second collision wall 74 shown in FIG. 3B, may be identical to the shape of the second collision wall 74' shown in FIG. 5B, may be identical to the shape of the second collision wall 74" shown diagram 6A, or may be another shape.

Manufacturing Process of Cooling Mechanism

Figure 11:
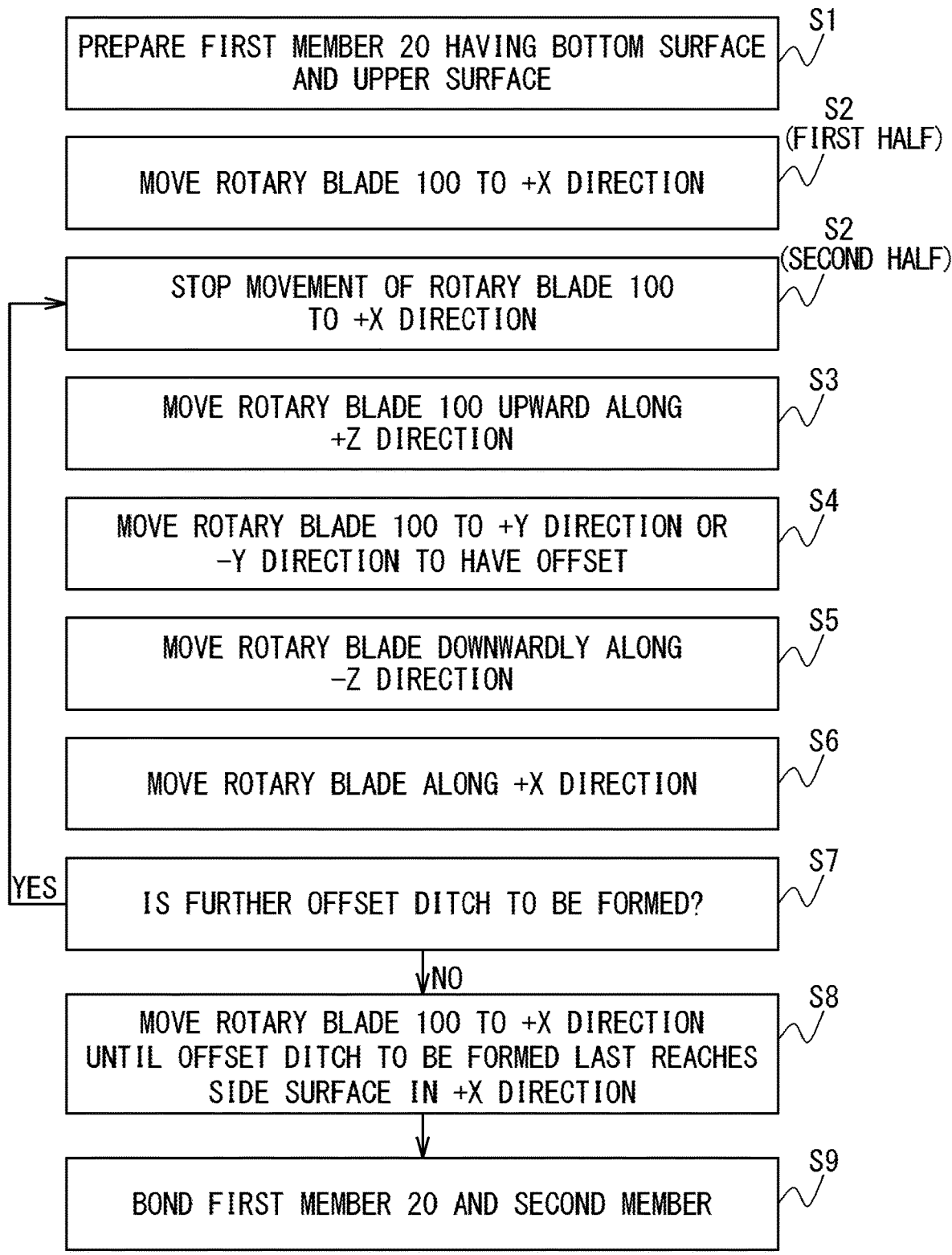
FIG. 11 is a flow chart showing a manufacturing process of the cooling mechanism.

Referring to FIG. 11 to FIG. 19, a manufacturing process of the cooling mechanism will be described. FIG. 11 is a flow chart showing the manufacturing process of the cooling mechanism.

Figure 12:
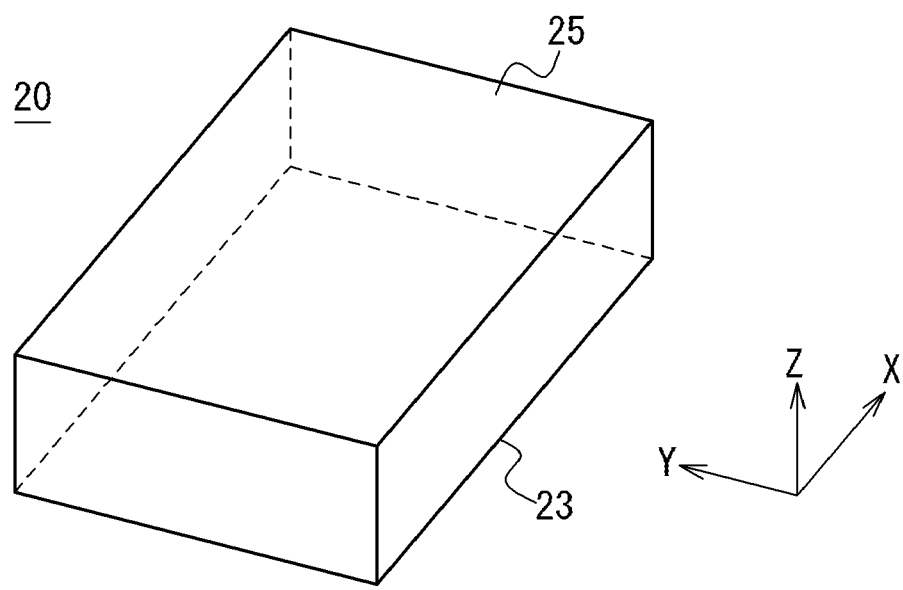
FIG. 12 is a schematic perspective view of a first member 20.

At a first step S1, the first member 20 is prepared to have a bottom surface 23 and an upper surface 25. FIG. 12 shows a schematic perspective view of the prepared first member 20. Note that the bottom surface 23 is a surface to be cooled or a surface in contact with a cooling target. The first step S1 is a step of preparing the first member 20.

Figure 13A:
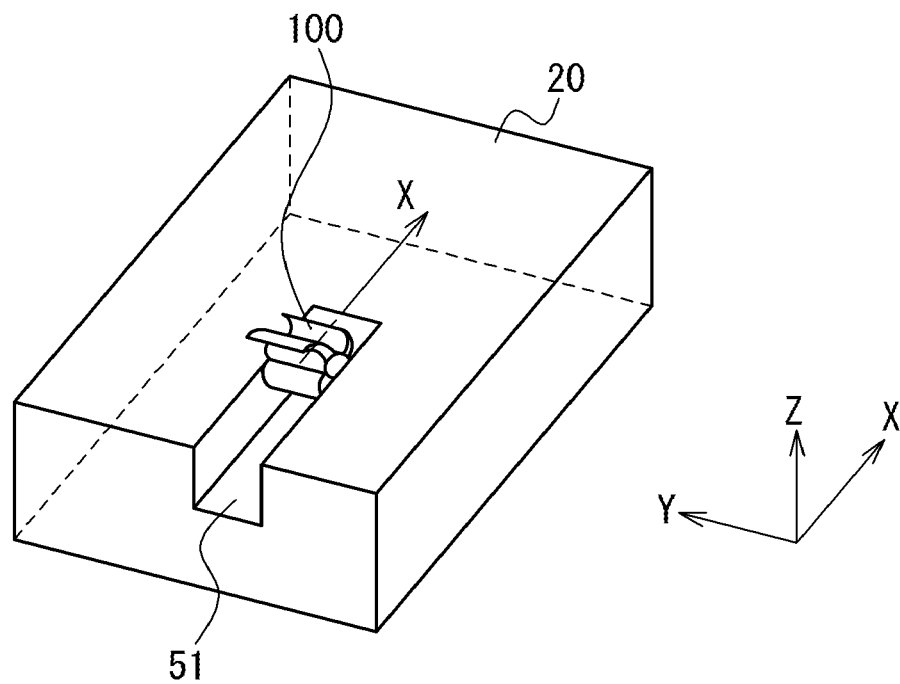
FIG. 13A is a schematic perspective view showing the state during execution of a second step.
Figure 13B:
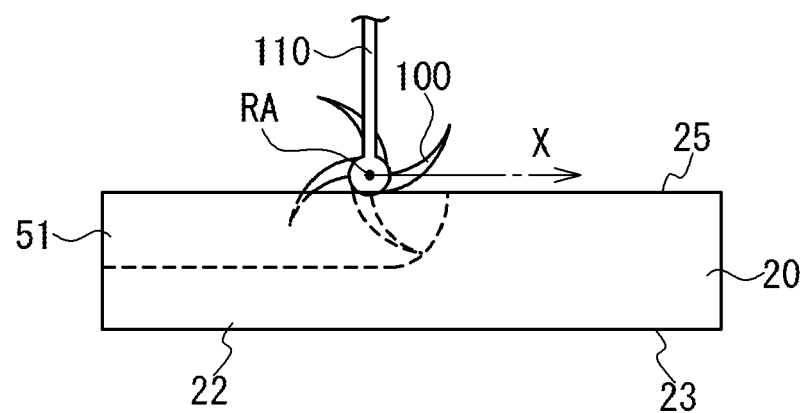
FIG. 13B is a schematic side view showing the state during execution of the second step.
Figure 13B:
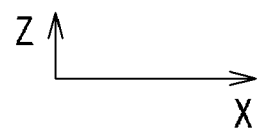

In a first half of a second step S2, a rotary blade 100 is moved along the +X direction (the first direction) and along the bottom surface 23 while the rotary blade 100 is rotated. FIG. 13A and FIG. 13B are a schematic perspective view and a schematic side view showing the state during execution of the second step S2. Note that in FIG. 13A (and FIG. 14A, FIG. 15, FIG. 16, FIG. 17A), a supporting member 110 which supports the rotary blade 100 to be rotatable is omitted.

Figure 14A:
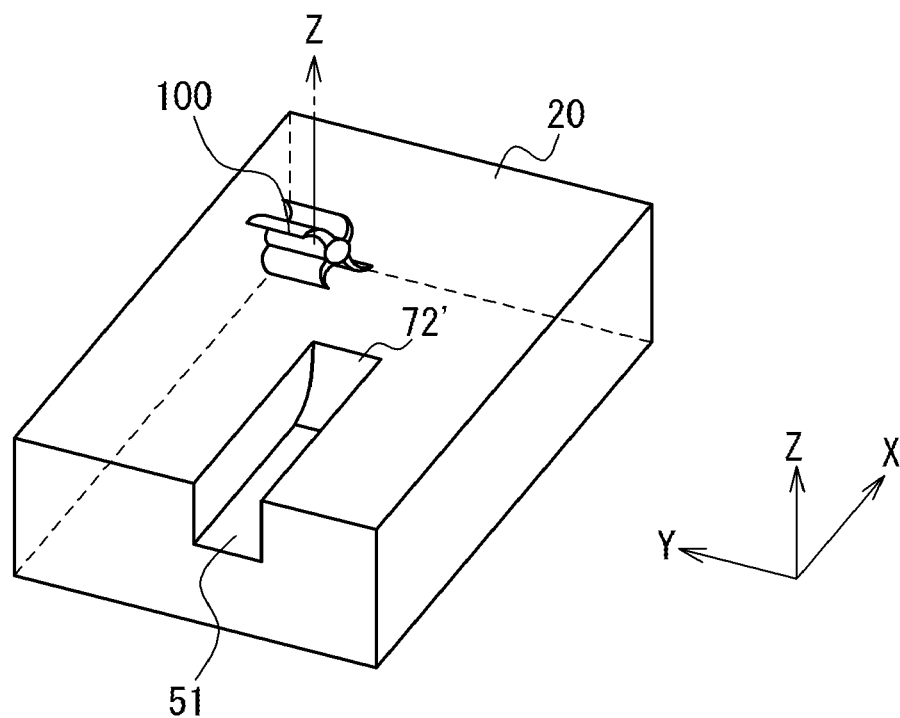
FIG. 14A is a schematic perspective view showing the state during execution of a third step.
Figure 14B:
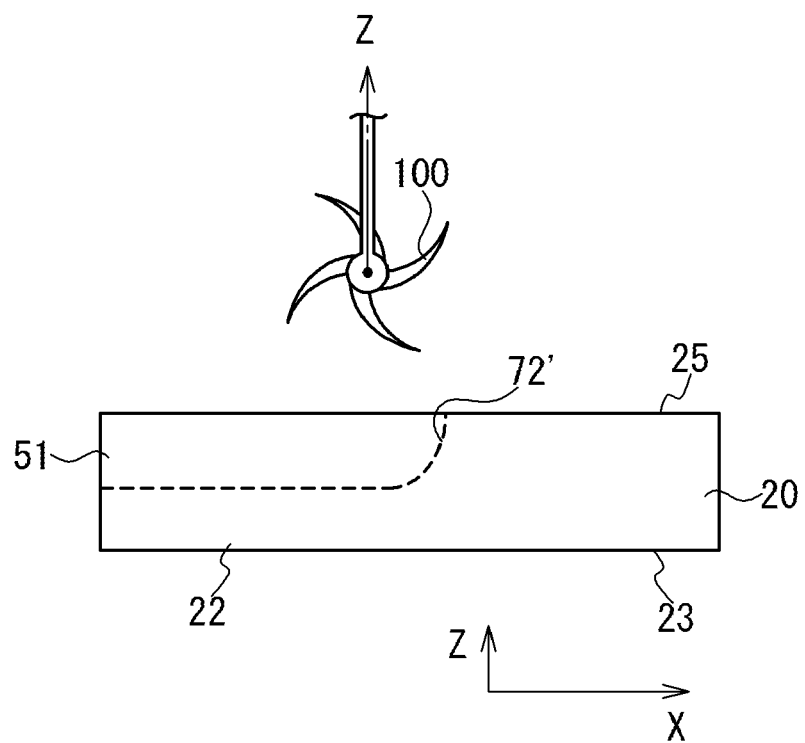
FIG. 14B is a schematic side view showing the state during execution of the third step.

By moving the rotating rotary blade 100 along the +X direction (the first direction), the first ditch 51 is formed in the first member 20 to extend to the +X direction (the first direction). Note that the rotation axis RA of the rotary blade 100 is parallel to the Y axis. In the second half of the second step, the movement of the rotary blade 100 to the +X direction (the first direction) is stopped. Since the movement of the rotary blade 100 to the +X direction is stopped, the first collision wall 72' is formed on the side of the first member 20 in the +X direction from the rotary blade 100. The first collision wall 72' is formed through cutting by the rotary blade 100. The first collision wall 72' has the surface of an arc shape, and the radius of the arc is equal to the rotation radius of the rotary blade 100 (that is, a distance from the rotation axis RA of the rotary blade 100 to the tip of the rotary blade). Note that the first collision wall 72' is shown in FIG. 14B. Also, the first collision wall 72' has a surface which is far from the bottom surface 23 as proceeding for the +X direction (the first direction). Note that the step of forming the first collision wall 72' is included in a step of forming the first connection section 70. The first connection section 70 is a region which connects the first ditch 51 and a second ditch 61 to be described later, and is the region having the first collision wall 72' and the second collision wall 74' to be described later. Note that the first connection section 70 (referring to FIG. 16, FIG. 17A, and FIG. 17B, if necessary) may be identical to the first connection section 70 in the example shown in FIG. 5B and FIG. 5C. Note that the first collision wall 72' is on the side of the first ditch 51 in the +X direction, and is formed in the end of the first connection section 70 in the +X direction.

Note that a part of the first member 20 in the −Z direction from the bottom surface of the first ditch 51 configures the bottom wall 22. The second step S2 is a step of forming the first ditch 51.

At a third step S3, the rotary blade 100 is moved (raised) along the +Z direction (i.e. the direction toward the upper surface 25 from the bottom surface 23). FIG. 14A and FIG. 14B are respectively a schematic perspective view and a schematic side view showing the state during execution of the third step S3. By moving the rotary blade 100 along the +Z direction, the rotary blade 100 leaves the first ditch 51. The third step S3 is a rotary blade rising step.

Figure 15:
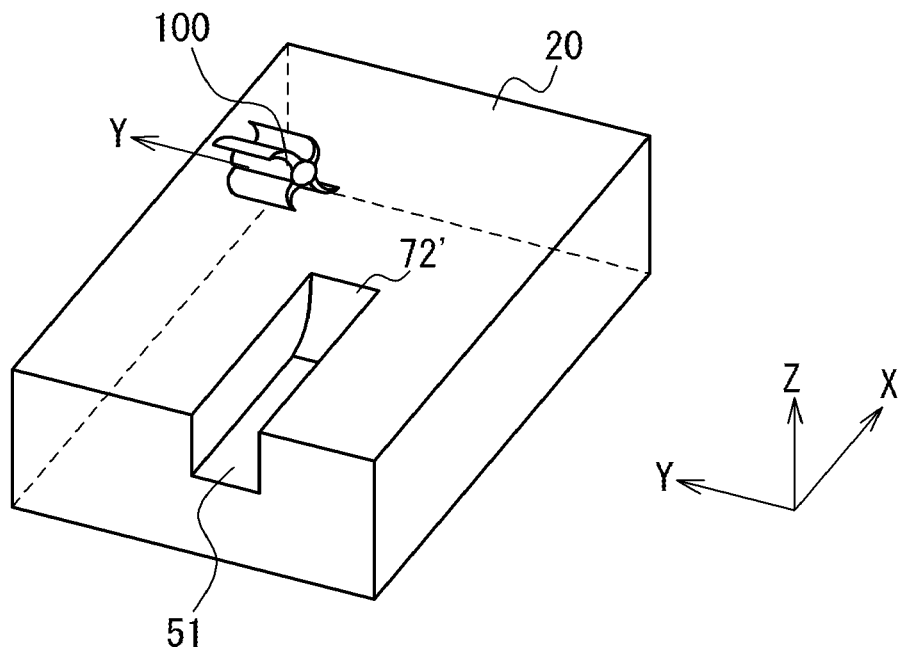
FIG. 15 is a schematic perspective view showing the state during execution of a fourth step.

At a fourth step S4, the rotary blade 100 having been risen is moved to the +Y direction or the −Y direction. In other words, the risen rotary blade 100 is offset moved to have a movement component in the second direction parallel to the bottom surface 23 (the +Y direction or the −Y direction) and perpendicular to the +X direction (the first direction). FIG. 15 is a schematic perspective view showing the state during execution of the fourth step S4.

Note that the movement component in the direction along the X axis or the movement component in the direction along the Z axis may be contained in the above-mentioned offset movement. That is, the movement in the direction along the Y axis may be combined with the movement in a direction along the X axis or the movement in a direction along the Z axis. For example, as shown in FIG. 5G, when the distance W3 between the upper end of the first collision wall 72' and the upper end of the second collision wall 74' should be made smaller than twice the rotation radius of the rotary blade 100, the movement of the rotary blade 100 in the direction along the Y axis and the movement of the rotary blade 100 in the +X direction (the first direction) are combined. The fourth step S4 is an offset movement step.

Figure 16:
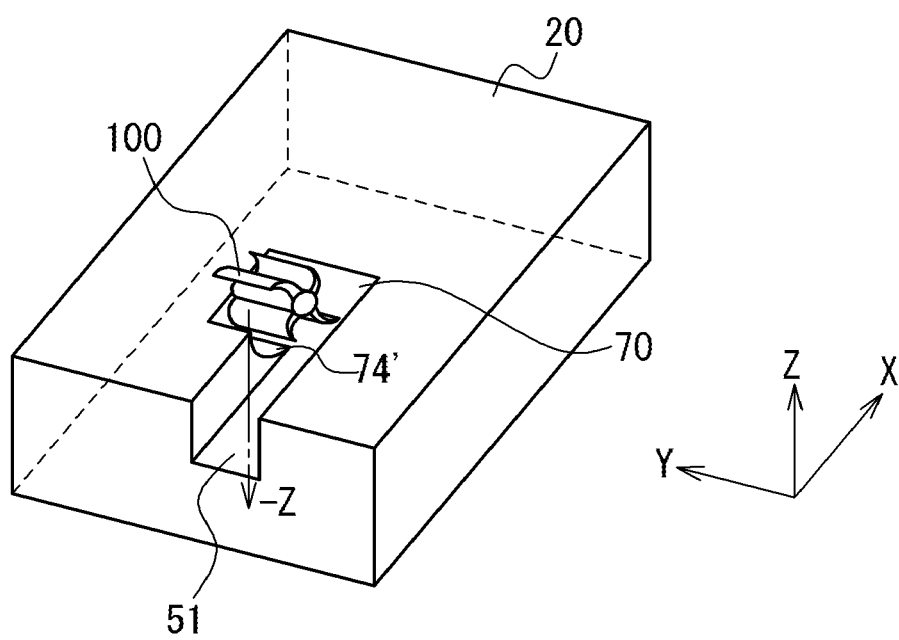
FIG. 16 is a schematic perspective view showing the state after execution of a fifth step.

At a fifth step S5, the rotary blade 100 is moved (i.e. descended) along the −Z direction (i.e., the direction proceeding for the bottom surface 23 from the upper surface 25) while rotating the rotary blade 100 which has been offset moved. FIG. 16 is a schematic perspective view showing a state after execution of the fifth step S5.

By the descending operation, the second collision wall 74' is formed in the first member 20. The second collision wall 74' has a surface of an arc shape, and the radius of the arc is equal to the rotation radius of the rotary blade 100 (that is, a distance from the rotation axis RA of the rotary blade 100 to the tip of the rotary blade). Also, the second collision wall 74' is a surface in which the distance from the bottom surface 23 becomes short as proceeding for the +X direction (the first direction). The fifth step is the rotary blade descending step. Note that the step of forming the second collision wall 74' is contained in the step of forming the first connection section 70. The second collision wall 74' is formed at the end of the first connection section 70 in the −X direction and the end of the second ditch 61 in the −X direction.

Figure 17A:
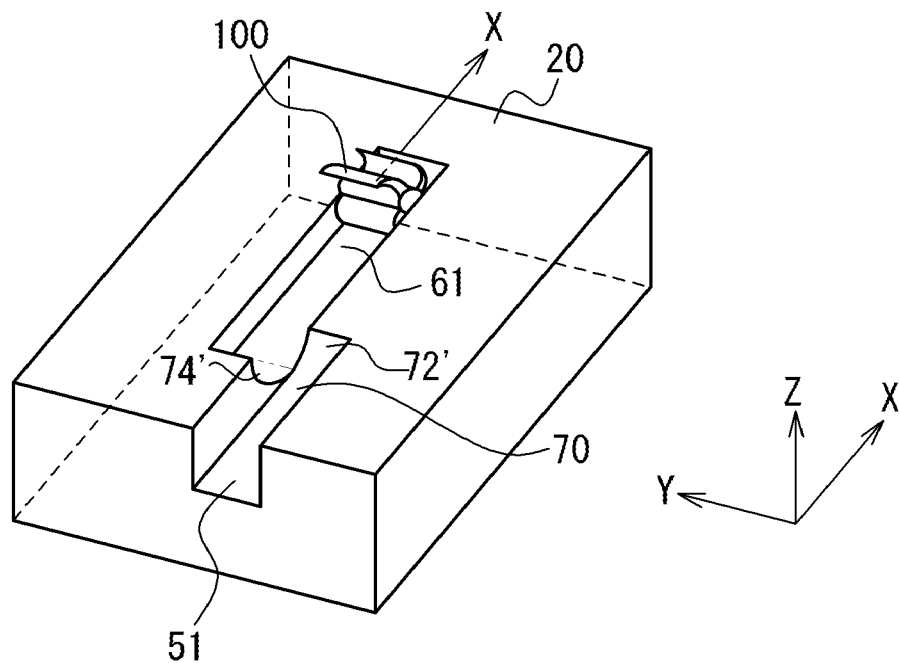
FIG. 17A is a schematic perspective view showing the state during execution of a sixth step.
Figure 17B:
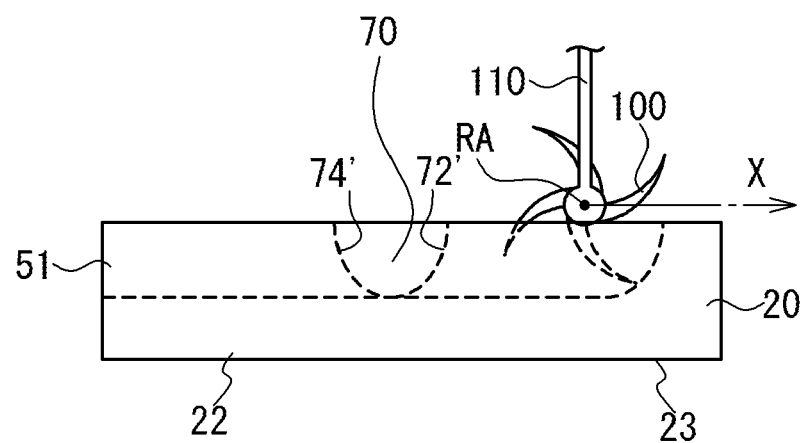
FIG. 17B is a schematic side view showing the state during execution of the sixth step.

At a sixth step S6, the rotary blade 100 is moved along the +X direction (the first direction) along the bottom surface 23 while rotating the rotary blade 100. FIG. 17A and FIG. 17B are respectively a schematic perspective view and a schematic side view showing the state during execution of the sixth step S6.

By moving the rotary blade 100 along the +X direction (the first direction), the second ditch 61 is formed in the first member 20 to extend to the +X direction (the first direction). Note that the rotation axis RA of the rotary blade 100 is parallel to the Y axis.

The second ditch 61 is arranged to have an offset in the +Y direction or the −Y direction to the first ditch 51. The sixth step S6 is a step of forming the second ditch 61.

At a seventh step S7, it is determined whether another offset ditch is to be formed. The determination may be carried out by a user and may be automatically carried out by a control device which controls the rotary blade 100.

At the seventh step S7, when the offset ditch is determined to be further formed (in case of YES), the third ditch is formed to have an offset in the +Y direction or the −Y direction to the second ditch 61. In this case, it is necessary to execute a process of the second half of the above second step S2 (the step of stopping the movement of the rotary blade 100 to the +X direction) to the sixth step S6 once again. When a fourth ditch, a fifth ditch and so on as the offset ditches are to be further formed, the process of the second half the above-mentioned second step S2 (the step of stopping the movement of the rotary blade 100 to the +X direction) to the sixth step S6 is repeatedly executed.

At the seventh step S7, when the offset ditches are determined not to be further form (in case of NO), the control advances to an eighth step S8.

Figure 18:
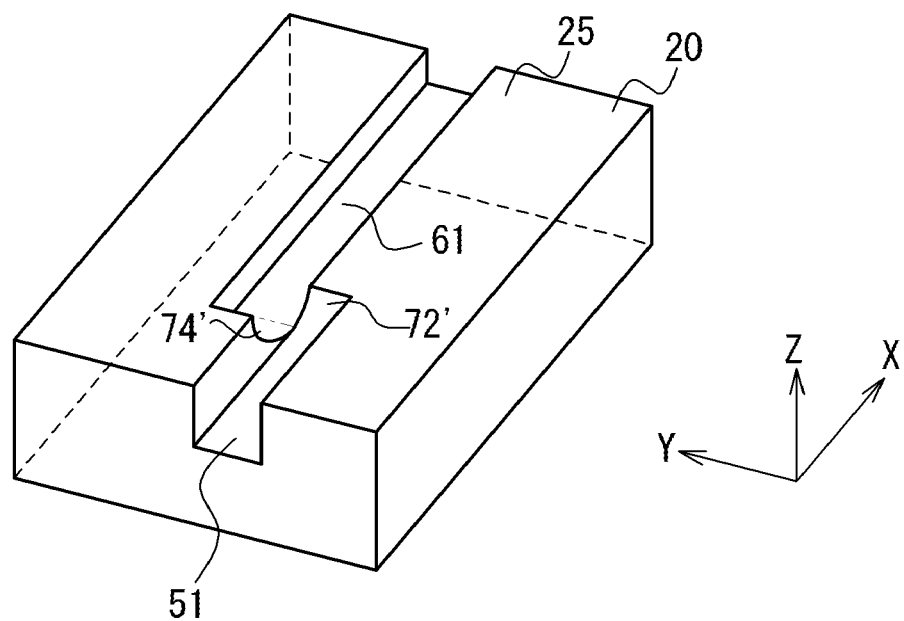
FIG. 18 is a schematic perspective view showing the state after execution of an eighth step.

At an eighth step S8, the rotary blade 100 is moved along the +X direction until the offset ditch to be formed last reaches an end surface of the first member 20 in the +X direction (the first direction). FIG. 18 is a schematic perspective view showing a state after execution of the eighth step S8. Note that the eighth step S8 may be incorporated into the sixth step S6 (in other words, the eighth step S8 may be omitted).

Figure 19:
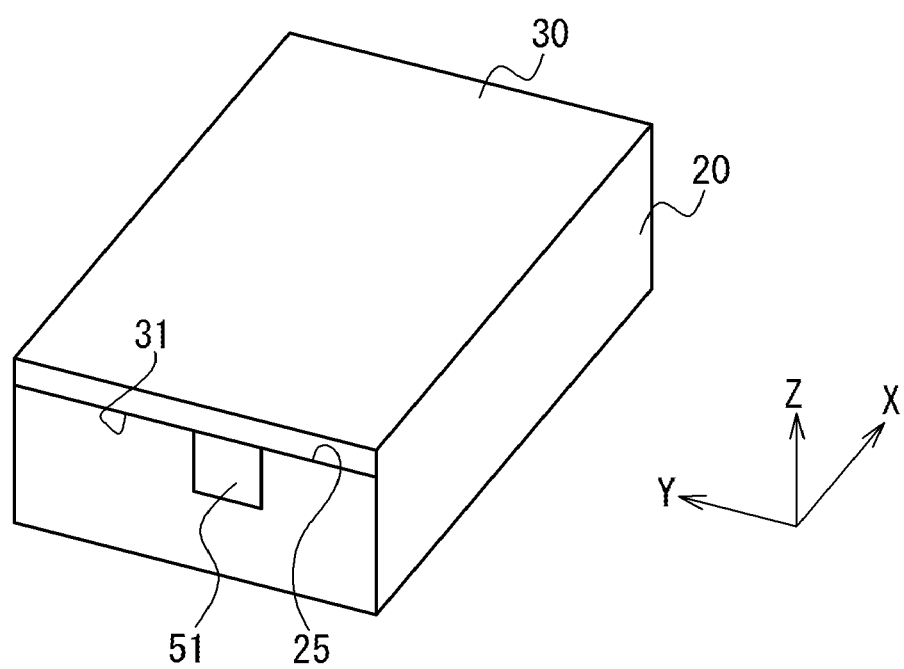
FIG. 19 is a schematic perspective view showing the state after execution of a ninth step.

At a ninth step S9, the upper surface 25 of the first member 20 and the bottom surface 31 of the upper wall 30 as the second member are bonded by welding, brazing and so on. FIG. 19 is a schematic perspective view showing a state after execution of the ninth step S9. The first ditch 51, the second ditch 61, and so on function as the passages through which the cooling medium passes. Also, the first collision wall 72' functions as the surface which generates the rotary flow RT effectively. Also, the second collision wall 74' functions as the surface which maintains the rotary flow RT effectively. The ninth step S9 is a bonding step of the first member 20 and the second member (the upper wall 30).

Note that in the example shown in FIG. 11 to FIG. 19, the step of forming the first collision wall 72' is executed between the step of forming the first ditch 51 (S2) and the step of forming the second ditch 61 (S6). Alternatively, the first ditch 51 may be formed by moving the rotating rotary blade 100 along the −X direction after the rotating rotary blade 100 is descended to form the first collision wall 72'. That is, the step of forming the first collision wall 72' may be executed before the step of forming the first ditch 51 (S2) and after the step of forming the first ditch 51 (S2). In the same way, the step of forming the first collision wall 72' may be executed before the step of forming the second ditch 61 (S6) and after the step of forming the second ditch 61 (S6).

In the example shown in FIG. 11 to FIG. 19, the step of forming the first collision wall 72' is executed before the step of forming the second collision wall 74". Alternatively, the step of forming the first collision wall 72' may be executed after the step of forming the second collision wall 74".

In the example shown in FIG. 11 to FIG. 19, the step of forming the second collision wall 74' is executed between the step of forming the first ditch 51 (S2) and the step of forming the second ditch 61 (S6). Alternatively, the second collision wall 74" may be formed by raising the rotary blade 100 after the second ditch 61 is formed by moving the rotating rotary blade 100 along the −X direction. That is, the step of forming the second collision wall 74' may be executed before the step of forming the second ditch 61 (S6) and may be executed after the step of forming the second ditch 61 (S6). In the same way, the step of forming the second collision wall 74' may be executed before the step of forming the first ditch 51 (S2) and may be executed after the step of forming the first ditch 51 (S2).

In manufacturing method of the cooling mechanism according to the embodiment, the first ditch 51 (the first passage) and the second ditch 61 (the second passage) having an offset to the first ditch in the direction along the Y axis can be formed by only combining the movement of the rotary blade 100 along the X axis, the movement of the rotary blade 100 along the Y axis and the movement of the rotary blade 100 along the Z axis. Also, in the manufacturing method of cooling mechanism according to the embodiment, the first collision wall 72' and the second collision wall 74' can be formed by only combining the movement of the rotary blade 100 along the X axis, the movement of the rotary blade 100 along the Y axis and the movement of the rotary blade 100 along the Z axis. Therefore, the manufacture of the cooling mechanism with high cooling efficiency becomes able to be easily carried out.

The present invention is not limited to each of the above embodiments. It would be understood that each embodiment may be changed or modified appropriately in the range of the technical thought of the present invention. Various techniques which are used in the embodiments or the modification examples are possible to apply to another embodiment or another modification example, unless the technical contradiction occurs.

The present invention is based on Japanese Patent Application No. 2015-47695 which was filed on Mar. 10, 2015 and claims a priority on convention based on the application. The disclosure thereof is incorporated herein by reference.

The invention claimed is:

1. A cooling mechanism of a combustion chamber comprising:
    a bottom wall in contact with the combustion chamber;
    an upper wall; and
    a cooling passage arranged between the bottom wall and the upper wall, wherein the cooling passage comprises:
    a first passage arranged along the bottom wall to extend to a first direction;
    a second passage arranged along the bottom wall to extend to the first direction; and
    a first connection section connected with the first passage and the second passage,
    wherein a longitudinal center axis of the first passage and a longitudinal center axis of the second passage are separated from each other in a second direction perpendicular to the first direction and extending along the bottom wall,
    wherein the second passage is connected with a part of the first connection section in the first direction,
    wherein the first passage is connected with a part of the first connection section in a direction opposite to the first direction,
    wherein a first collision wall is arranged in an end of the first connection section in the first direction such that a part of cooling medium which flows through the first connection section to the first direction collides with the first collision wall,
    wherein the first collision wall has a surface apart from the bottom wall as proceeding to the first direction,
    wherein a part of the first passage and a part of the second passage lie on a line that passes along the first direction, and the first passage and second passage overlap when viewed in the first direction,
    wherein the first passage is surrounded by the bottom wall, the upper wall, a first side wall, and a second side wall when viewed in the first direction,
    wherein the second passage is surrounded by the bottom wall, the upper wall, a third side wall, and a fourth side wall when viewed in the first direction,
    wherein the first connection section is surrounded by the bottom wall, the upper wall, the first side wall, and the third side wall when viewed in the first direction.

2. The cooling mechanism of the combustion chamber according to claim 1, wherein a distance between a longitudinal center axis of the first passage and a longitudinal center axis of the second passage is smaller than a width of the first passage in the second direction.

3. The cooling mechanism of the combustion chamber according to claim 2, wherein a second collision wall that collides with a part of the cooling medium which flows through the first connection section to the direction opposite to the first direction is arranged on an end of the first connection section in the direction opposite to the first direction,
    and wherein the second collision wall has a surface becoming near the bottom wall as heading to the first direction.

4. The cooling mechanism of the combustion chamber according to claim 3,
    wherein the first collision wall is connected with the upper wall and the bottom wall,
    and wherein a cross section of the first collision wall perpendicular to the second direction has a curved shape.

5. The cooling mechanism of the combustion chamber according to claim 2,
    wherein the first collision wall is connected with the upper wall and the bottom wall,
    and wherein a cross section of the first collision wall perpendicular to the second direction has a curved shape.

6. The cooling mechanism of the combustion chamber according to claim 1, wherein a second collision wall that collides with a part of the cooling medium which flows through the first connection section to the direction opposite to the first direction is arranged on an end of the first connection section in the direction opposite to the first direction, and
    wherein the second collision wall has a surface becoming near the bottom wall as heading to the first direction.

7. The cooling mechanism of the combustion chamber according to claim 6, wherein the second collision wall is connected with the upper wall and the bottom wall,
    and wherein a cross section of the second collision wall perpendicular to the second direction has a curved shape.

8. The cooling mechanism of the combustion chamber according to claim 6, wherein a lower end of the second collision wall is positioned in the first direction, compared with a lower end of the first collision wall.

9. The cooling mechanism of the combustion chamber according to claim 6, wherein an area of cross section of the first passage perpendicular to the first direction is equal to an area of cross section of the first connection section perpendicular to the first direction, and
    wherein an area of cross section of the second passage perpendicular to the first direction is equal to an area of cross section of the first connection section perpendicular to the first direction.

10. The cooling mechanism of the combustion chamber according to claim 1,
    wherein the first collision wall is connected with the upper wall and the bottom wall,
    and wherein a cross section of the first collision wall perpendicular to the second direction has a curved shape.

11. The cooling mechanism of the combustion chamber according to claim 1, wherein the cooling passage comprises:

a third passage arranged along the bottom wall to extend to the first direction; and a second connection section connected with the second passage and the third passage, wherein a longitudinal center axis of the second passage and a longitudinal center axis of the third passage are separated from each other in the second direction, wherein the third passage is connected with a part of the second connection section in the first direction, and wherein the second passage is connected with a part of the second connection section in the direction opposite to the first direction.

12. A cooling mechanism of a combustion chamber comprising:

a bottom wall in contact with the combustion chamber;

an upper wall; and a cooling passage arranged between the bottom wall and the upper wall, wherein the cooling passage comprises:

a first passage arranged along the bottom wall to extend to a first direction;

a second passage arranged along the bottom wall to extend to the first direction; and a first connection section connected with the first passage and the second passage, wherein a longitudinal center axis of the first passage and a longitudinal center axis of the second passage are separated from each other in a second direction perpendicular to the first direction and extending along the bottom wall, wherein the second passage is connected with a part of the first connection section in the first direction, wherein the first passage is connected with a part of the first connection section in a direction opposite to the first direction, wherein the cooling passage further comprises:

a third passage arranged along the bottom wall to extend to the first direction;

a fourth passage arranged along the bottom wall to extend to the first direction; and a second connection section connected with the third passage and the fourth passage, wherein a longitudinal center axis of the fourth passage and a longitudinal center axis of the third passage are separated from each other in the second direction, wherein the fourth passage is connected with a part of the second connection section in the first direction, wherein the third passage is connected with a part of the second connection section in the direction opposite to the first direction, wherein the first passage and the third passage are arranged to be adjacent to each other, wherein the second passage and the fourth passage are arranged to be adjacent to each other, wherein a position of the second connection section along the first direction is different from a position of the first connection section along the first direction, wherein a part of the first passage and a part of the second passage lie on a line that passes along the first direction, and the first passage and second passage overlap when viewed in the first direction, wherein the first passage is surrounded by the bottom wall, the upper wall, a first side wall, and a second side wall when viewed in the first direction, wherein the second passage is surrounded by the bottom wall, the upper wall, a third side wall, and a fourth side wall when viewed in the first direction, and wherein the first connection section is surrounded by the bottom wall, the upper wall, the first side wall, and the third side wall when viewed in the first direction.

13. A rocket engine comprising a cooling mechanism of a combustion chamber, wherein the cooling mechanism comprises:

a bottom wall in contact with the combustion chamber;

an upper wall; and a cooling passage arranged between the bottom wall and the upper wall, wherein the cooling passage comprises:

a first passage arranged along the bottom wall to extend to a first direction;

a second passage arranged along the bottom wall to extend to the first direction; and a first connection section connected with the first passage and the second passage, wherein a longitudinal center axis of the first passage and a longitudinal center axis of the second passage are separated from each other in a second direction perpendicular to the first direction and extending along the bottom wall, wherein the second passage is connected with a part of the first connection section in the first direction, wherein the first passage is connected with a part of the first connection section in a direction opposite to the first direction, wherein a first collision wall is arranged in an end of the first connection section in the first direction such that a part of cooling medium which flows through the first connection section to the first direction collides with the first collision wall, wherein the first collision wall has a surface apart from the bottom wall as proceeding to the first direction, wherein a part of the first passage and a part of the second passage lie on a line that passes along the first direction, and the first passage and second passage overlap when viewed in the first direction, wherein the first passage is surrounded by the bottom wall, the upper wall, a first side wall, and a second side wall when viewed in the first direction, wherein the second passage is surrounded by the bottom wall, the upper wall, a third side wall, and a fourth side wall when viewed in the first direction, and wherein the first connection section is surrounded by the bottom wall, the upper wall, the first side wall, and the third side wall when viewed in the first direction.

14. A rocket engine comprising a cooling mechanism of a combustion chamber, wherein the cooling mechanism comprises:

a bottom wall in contact with the combustion chamber;

an upper wall; and a cooling passage arranged between the bottom wall and the upper wall, wherein the cooling passage comprises:

a first passage arranged along the bottom wall to extend to a first direction;

a second passage arranged along the bottom wall to extend to the first direction; and a first connection section connected with the first passage and the second passage, wherein a longitudinal center axis of the first passage and a longitudinal center axis of the second passage are separated from each other in a second direction perpendicular to the first direction and extending along the bottom wall, wherein the second passage is connected with a part of the first connection section in the first direction, wherein the first passage is connected with a part of the first connection section in a direction opposite to the first direction, wherein a first collision wall is arranged in an end of the first connection section in the first direction such that a part of cooling medium which flows through the first connection section to the first direction collides with the first collision wall, wherein the first collision wall has a surface apart from the bottom wall as proceeding to the first direction, wherein the cooling passage further comprises:

a third passage arranged along the bottom wall to extend to the first direction;

a fourth passage arranged along the bottom wall to extend to the first direction; and a second connection section connected with the third passage and the fourth passage, wherein a longitudinal center axis of the fourth passage and a longitudinal center axis of the third passage are separated from each other in the second direction, wherein the fourth passage is connected with a part of the second connection section in the first direction, wherein the third passage is connected with a part of the second connection section in the direction opposite to the first direction, wherein the first passage and the third passage are arranged to be adjacent to each other, wherein the second passage and the fourth passage are arranged to be adjacent to each other, wherein a position of the second connection section along the first direction is different from a position of the first connection section along the first direction, wherein a part of the first passage and a part of the second passage lie on a line that passes along the first direction, and the first passage and second passage overlap when viewed in the first direction, wherein the first passage is surrounded by the bottom wall, the upper wall, a first side wall, and a second side wall when viewed in the first direction, wherein the second passage is surrounded by the bottom wall, the upper wall, a third side wall, and a fourth side wall when viewed in the first direction, and wherein the first connection section is surrounded by the bottom wall, the upper wall, the first side wall, and the third side wall when viewed in the first direction.

15. A method of manufacturing a cooling mechanism of a combustion chamber, comprising:

preparing a first member of the combustion chamber having a bottom surface and an upper surface;

forming a first ditch in the first member to extend to a first direction, by moving a rotating rotary blade to the first direction or a direction opposite to the first direction along the bottom surface;

forming a second ditch in the first member to extend to the first direction, by moving the rotating rotary blade to the first direction or the direction opposite to the first direction along the bottom surface;

forming a first connection section connecting the first ditch and the second ditch; and forming an upper wall, by bounding a second member to the upper surface of the first member, wherein the forming of the first connection section comprises forming a first collision wall in an end of the first connection section in the first direction by cutting by the rotating rotary blade such that a distance from the bottom surface becomes larger as proceeding toward the first direction, and wherein a part of the first ditch and a part of the second ditch lie on a line that passes along the first direction, and the first ditch and the second ditch overlap when viewed in the first direction, wherein the first ditch is surrounded by a bottom wall of the first ditch, the upper wall, a first side wall, and a second side wall when viewed in the first direction, wherein the second ditch is surrounded by a bottom wall of the second ditch, the upper wall, a third side wall, and a fourth side wall when viewed in the first direction, and wherein the first connection section is surrounded by a bottom wall of the first connection section, the upper wall, the first side wall, and the third side wall when viewed in the first direction.

16. The method of manufacturing the cooling mechanism according to claim 15, wherein the forming of the first collision wall is executed between the forming of the first ditch and the forming of the second ditch.

17. The method of manufacturing the cooling mechanism according to claim 15, wherein the forming of the first collision wall is executed before the forming of the first ditch and the forming of the second ditch.

18. The method of manufacturing the cooling mechanism according to claim 15, wherein the forming of the first connection section comprises:

forming a second collision wall in an end of the first connection section in the direction opposite to the first direction by cutting by the rotating rotary blade such that a distance from the bottom surface becomes smaller as proceeding toward the first direction.

* * * * *